United States Patent
Shearman et al.

(10) Patent No.: US 11,698,498 B2
(45) Date of Patent: Jul. 11, 2023

(54) COOLING MULTIPLE HIGH-DENSITY NETWORK PLUGGABLE OPTICAL MODULES USING A SHARED HEAT EXCHANGER

(71) Applicant: Ciena Corporation, Hanover, MD (US)

(72) Inventors: Simon John Shearman, Almonte (CA); Michael Reginald Bishop, Ottawa (CA); Terence Arthur Graham, Manotick (CA); Bonnie Lynne Mack, Carp (CA); Behzad Mohajer, Ottawa (CA); Marian Mocanita, Ottawa (CA)

(73) Assignee: Ciena Corporation, Hanover, MD (US)

( * ) Notice: Subject to any disclaimer, the term of this patent is extended or adjusted under 35 U.S.C. 154(b) by 8 days.

(21) Appl. No.: 17/408,637

(22) Filed: Aug. 23, 2021

(65) Prior Publication Data

US 2021/0382252 A1    Dec. 9, 2021

Related U.S. Application Data

(63) Continuation of application No. 16/671,638, filed on Nov. 1, 2019, now Pat. No. 11,112,573.

(51) Int. Cl.
*G02B 6/42*    (2006.01)

(52) U.S. Cl.
CPC ........... *G02B 6/4269* (2013.01); *G02B 6/428* (2013.01); *G02B 6/4261* (2013.01); *G02B 6/4277* (2013.01); *G02B 6/4292* (2013.01)

(58) Field of Classification Search
CPC .. G02B 6/4269; G02B 6/4261; G02B 6/4277; G02B 6/42

USPC .......................................................... 385/92
See application file for complete search history.

(56) References Cited

U.S. PATENT DOCUMENTS

| | | |
|---|---|---|
| 3,874,444 A | 4/1975 | Perce et al. |
| 4,837,663 A | 6/1989 | Zushi et al. |
| 5,136,464 A | 8/1992 | Ohmori |
| 5,995,368 A | 11/1999 | Lee et al. |
| 6,698,079 B1 | 3/2004 | Mimlitch, III et al. |
| 6,972,949 B1 | 12/2005 | Helgenberg et al. |
| 7,126,820 B2 | 10/2006 | Wei |
| 7,184,267 B2 | 2/2007 | Patel |
| 7,259,961 B2 | 8/2007 | Lucero et al. |
| 7,420,806 B1 | 9/2008 | Lima et al. |
| 7,447,020 B2 | 11/2008 | Xia et al. |
| 7,633,754 B1 | 12/2009 | Mumper |
| 7,701,710 B2 | 4/2010 | Tanaka et al. |
| 7,864,519 B2 | 1/2011 | Lin et al. |
| 7,933,120 B2 | 4/2011 | Tanaka et al. |

(Continued)

FOREIGN PATENT DOCUMENTS

WO    2010022597 A1    3/2010

*Primary Examiner* — Kaveh C Kianni
(74) *Attorney, Agent, or Firm* — Clements Bernard Walker; Christopher L. Bernard

(57) ABSTRACT

A module for multiple network pluggable optics is disclosed. The module includes a Printed Circuit Board (PCB); a faceplate connected to the PCB; a plurality of cage assemblies connected to the PCB, each cage assembly is configured to receive a pluggable optical module via a corresponding opening in the faceplate; and a shared heat exchanger that is integrally formed and substantially covers the plurality of cage assemblies, wherein the shared heat exchanger is configured to cool multiple pluggable optics in the plurality of cage assemblies.

20 Claims, 21 Drawing Sheets

(56) References Cited

U.S. PATENT DOCUMENTS

| | | |
|---|---|---|
| 7,957,133 B2 | 6/2011 | Zieman et al. |
| 8,154,867 B2 | 4/2012 | Shearman et al. |
| 8,446,725 B2 | 5/2013 | Lam et al. |
| 8,737,067 B1 | 5/2014 | Kim et al. |
| 8,755,192 B1 | 6/2014 | Schrempp et al. |
| 9,769,959 B2 | 9/2017 | Mayenburg et al. |
| 9,788,461 B2 | 10/2017 | Van Gaal |
| 9,924,615 B2 * | 3/2018 | Bucher ............... G02B 6/4277 |
| 10,114,182 B2 * | 10/2018 | Zbinden .............. G02B 6/4268 |
| 10,765,038 B1 * | 9/2020 | Leigh ................ H05K 7/20772 |
| 2003/0236019 A1 * | 12/2003 | Hanley ............... G02B 6/4292 |
| | | 439/372 |
| 2004/0032722 A1 | 2/2004 | Wrycraft et al. |
| 2005/0073809 A1 | 4/2005 | Chang |
| 2005/0078449 A1 | 4/2005 | Makooi et al. |
| 2006/0041783 A1 * | 2/2006 | Rabinovitz .......... G11B 33/128 |
| | | 714/6.12 |
| 2007/0258211 A1 | 5/2007 | Sonobe et al. |
| 2007/0223201 A1 | 9/2007 | Fujiya et al. |
| 2008/0186668 A1 | 8/2008 | Naufel et al. |
| 2008/0192454 A1 | 8/2008 | Knutsson |
| 2011/0182030 A1 * | 7/2011 | Mayer ................. H05K 7/1488 |
| | | 312/223.2 |
| 2011/0222241 A1 | 9/2011 | Shearman et al. |
| 2013/0100610 A1 | 4/2013 | Schneider et al. |
| 2014/0307389 A1 * | 10/2014 | Arvelo ................ H01L 23/473 |
| | | 29/890.035 |
| 2017/0077643 A1 * | 3/2017 | Zbinden .............. G02B 6/4268 |
| 2017/0269314 A1 * | 9/2017 | Gaal .................... G02B 6/4261 |
| 2019/0018199 A1 * | 1/2019 | Leigh ...................... G02B 6/36 |
| 2019/0146167 A1 * | 5/2019 | Leigh .................. G02B 6/4261 |
| | | 361/715 |
| 2020/0100379 A1 * | 3/2020 | O'Leary ............. H05K 7/1409 |
| 2020/0100386 A1 * | 3/2020 | Saturley ........... H05K 7/20336 |
| 2020/0153163 A1 * | 5/2020 | Guetig ................ H01R 13/5205 |
| 2020/0363598 A1 * | 11/2020 | Hjartarson .......... G02B 6/4292 |

* cited by examiner

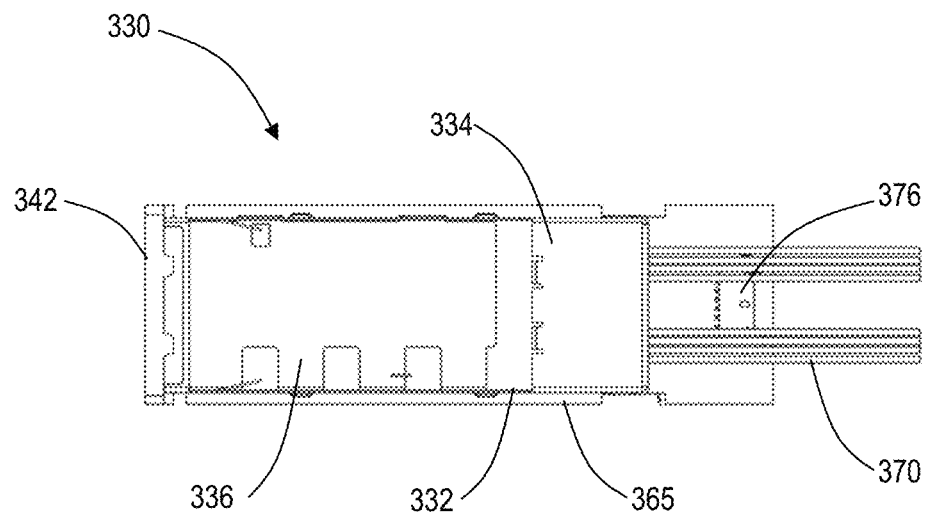
FIG. 11
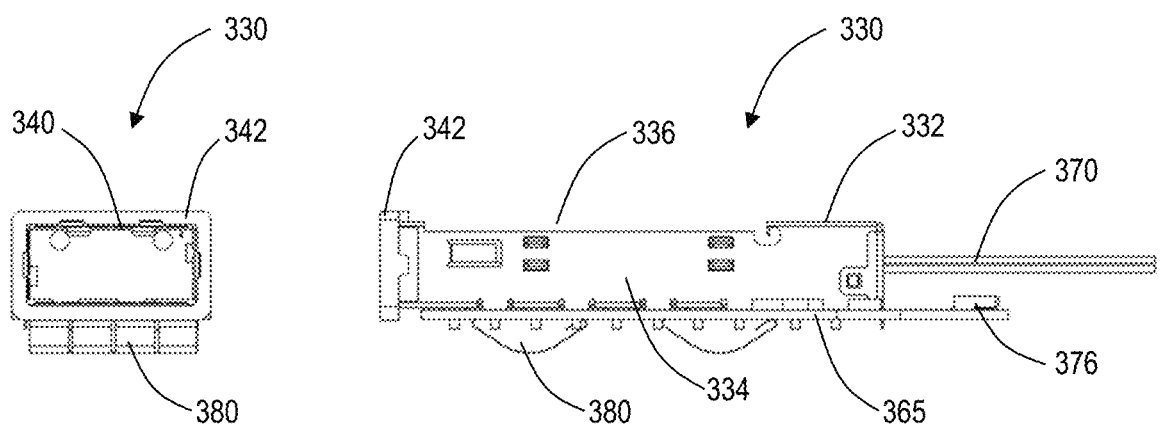
FIG. 12          FIG. 13

COOLING MULTIPLE HIGH-DENSITY NETWORK PLUGGABLE OPTICAL MODULES USING A SHARED HEAT EXCHANGER

CROSS-REFERENCE TO RELATED APPLICATION(S)

The present disclosure is a continuation of U.S. patent application Ser. No. 16/671,638, filed Nov. 1, 2019, the contents of which are incorporated by reference in their entirety.

FIELD OF THE DISCLOSURE

The present disclosure generally relates to networking hardware. More particularly, the present disclosure relates to systems and methods for cooling multiple high-density network pluggable optical modules using a shared heat exchanger, such as a shared heatsink or cold plate.

BACKGROUND OF THE DISCLOSURE

Networks, data centers, cloud computing, and the like continues to grow. Equipment manufacturers must continue to deliver substantial continuous reductions in per-bit metrics related to cost, space, and power. Telecommunication, data communication, high-performance computing, and the like systems are typically deployed in physical hardware shelves, chassis, rack-mounted units ("pizza boxes"), cabinets, etc. that are mounted in racks or frames, freestanding, or the like. For example, typical racks or frames are either 19, 21, or 23 inches in practice. Various standards associated with racks or frames are described by Telecordia's GR-63-CORE, "NEBS Requirements: Physical Protection" (April 2012), European Telecoms Standards Institute (ETSI), American National Standard Institute (ANSI), etc. One downside to the continual improvement in the per-bit metrics is the increased heat, i.e., power dissipation, and the corresponding cooling requirements (such as specified in the NEBS standards, note NEBS stands for Network Equipment-Building System). Even further, network operators want to deploy frames in data centers, telecom central offices, etc. as densely as possible, even further limiting cooling techniques, i.e., constraining airflow between the front and back.

In optical communications equipment, it is getting increasingly harder to cool the pluggable devices. In many situations, an array of pluggable optics ports (e.g., pluggable optical module cages) exists which can accomplish different transmission rates. Some pluggable ports can support a range of rates. For example, in a situation where these ports can achieve either 100 Gb/s, 200 Gb/s, or 400 Gb/s, the heat generated by each optical plug generally increases with transmission rate and transmission reach. For instance, one can achieve 400 Gb/s total transmission with a single port or with 2×200 Gb/s ports, or 4×100 Gb/s ports.

In current applications each pluggable optical module has an individual heatsink per pluggable module cage. The heatsink is biased toward the pluggable optical module which is inserted in the cage to remove any gaps created by production and assembly tolerances. The area for the heatsink may be limited by the density of the pluggable module cages. In many situations when higher transmission rates are used on the port, adjacent ports may not need to be populated. However, due to the individual heatsink configuration, the ports with higher transmission rates may not effectively utilize the heatsinks of the adjacent ports for further cooling.

BRIEF SUMMARY OF THE DISCLOSURE

In an embodiment, a module for multiple network pluggable optics includes a faceplate including a front face, a first wall extending from the front face, the first wall including a heat exchanger, and a second wall extending from the front face, the second wall being offset from the first wall; a plurality of cage assemblies positioned at least partially within a volume defined by the front face, the first wall and the second wall, each cage assembly is configured to receive a pluggable optical module; and a plurality of springs with one or more springs positioned between each cage assembly and the second wall, wherein the plurality of springs are configured to push the plurality of cage assemblies towards the first wall such that each pluggable optical module received into one of the plurality of cage assemblies is pressed against the heat exchanger. Each cage assembly can include a cage printed circuit board; and a cage configured to receive the pluggable optical module, the cage being connected to the cage printed circuit board.

The module can further include a main printed circuit board, wherein the cage printed circuit board of each cage assembly is electronically connected to the main printed circuit board, and each cage printed circuit board is sized such that a gap is formed between adjacent cage printed circuit boards and between the cage printed circuit board of the cage assembly laterally adjacent to the main circuit board. The cage printed circuit board of each cage assembly can be connected to the main printed circuit board via a rigid flex portion that is a printed circuit board that is thinner than the main printed circuit board and the cage printed circuit board. The faceplate can include a cutout and a gasket positioned within the cutout for each cage assembly. The heat exchanger can include one of a cooling plate and a heatsink with a plurality of fins. The faceplate can include a hook and a protrusion that engages a back of a cage assembly, the hook and protrusion being configured to press the cage assembly towards the front face.

Each cage assembly can include a cage with a cutout that is positioned adjacent to the heat exchanger, wherein the cutout is configured such that a contact surface of each pluggable optical module received into one of the plurality of cage assemblies is exposed to a mating surface of the heat exchanger by each cutout allowing thermal contact between the contact surface of each pluggable optical module and the mating surface of the heat exchanger. The first wall can include a recess adjacent to the front face, the recess being configured to receive a portion of a flange of the cage assembly. The first wall can include chamfer at least partially facing the front face which is configured to act as a ramp to guide an end of a pluggable optical module into a cage of the cage assembly. The module can further include a pluggable heatsink sized to match a width and a height of the pluggable optical module and configured to be received by each of the plurality of cage assemblies and pressed against the heat exchanger, the pluggable heatsink includes one or more channels extending therethrough that are configured for cooling air to pass through the pluggable heatsink and that are sized to attenuate electromagnetic signals exiting or entering the cage, and an air filter positioned upstream of the one or more channels configured to filter cooling air that enters the one or more channels.

In another embodiment, a method for cooling multiple network pluggable optics includes providing a faceplate including a front face, a first wall extending from the front face, the first wall including a heat exchanger, and a second wall extending from the front face, the second wall being offset from the first wall; providing a plurality of cage assemblies positioned at least partially within a volume defined by the front face, the first wall and the second wall, each cage assembly is configured to receive a pluggable optical module; providing a plurality of springs with one or more springs positioned between each cage assembly and the second wall; and pushing each of the plurality of cage assemblies towards the first wall with the plurality of springs such that each pluggable optical module received into one of the plurality of cage assemblies is pressed against the heat exchanger.

Each cage assembly can be provided to include a cage printed circuit board, and a cage configured to receive the pluggable optical module, the cage being connected to the cage printed circuit board. The module can include a main printed circuit board, and the cage printed circuit board of each cage assembly is electronically connected to the main printed circuit board, the method can further include configuring each cage assembly such that a gap is formed between adjacent cage printed circuit boards and between the cage printed circuit board of the cage assembly laterally adjacent to the main circuit board. The faceplate can include a hook and a protrusion, and the method can include pushing a cage assembly into the volume until the protrusion engages a back of the cage assembly. Each cage assembly can include a cage with a cutout that is positioned adjacent to the heat exchanger, the method can further include inserting a pluggable optical module into the cage such that a contact surface of each pluggable optical module received into the cage is exposed to a mating surface of the heat exchanger by the cutout allowing thermal contact between the contact surface of the pluggable optical module and the mating surface of the heat exchanger. The first wall can include chamfer at least partially facing the front face, the method can further include inserting a pluggable optical module into a cage of the cage assembly with an end of the pluggable optical module being guided by the chamfer which acts as a ramp to guide the end of each pluggable optical module into the cage.

In a further embodiment, a faceplate of a module for multiple network pluggable optics includes a front face; a first wall extending from the front face, the first wall including a heat exchanger integrated therein; and a second wall extending from the front face parallel to the first wall, the second wall being offset from the first wall, wherein the front face, the first wall, and the second wall form a volume configured to hold a plurality of cage assemblies between the first wall and the second wall such that multiple pluggable optical modules received into the plurality of cage assemblies are in thermal contact with heat exchanger, and the second wall is configured to oppose a spring force that pushes the cage assemblies toward the heat exchanger. The faceplate can further include a plurality of cutouts in the front face, and a gasket positioned within each of the plurality of cutouts, each of the plurality of cutouts configured to be aligned with one of the plurality of cage assemblies. The first wall can include a recess adjacent to the front face and a chamfer opposite the front face relative to the recess, the recess being a configured to receive a portion of a flange of the cage assembly, and the chamfer configured to act as a ramp to guide an end of a pluggable optical module into a cage of a cage assembly.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a front perspective diagram of the platform, FIG. 2 is a front view of the platform, FIG. 3 is a rear perspective diagram of the platform, and FIG. 4 is an internal cross-sectional diagram of the platform.

FIG. 11 is a top perspective diagram of a cage assembly.

FIG. 12 is a front perspective diagram of the cage assembly of FIG. 11.

FIG. 13 is a side perspective diagram of the cage assembly of FIG. 11.

DETAILED DESCRIPTION OF THE DISCLOSURE

The present disclosure relates to systems and methods for cooling multiple high-density network pluggable optical modules using a shared heat exchanger. The present disclosure uses a module with a faceplate with a heat exchanger that is configured to cool multiple pluggable optics. Each pluggable optic is held in the module by a cage assembly that includes a cage for holding the pluggable optic and a cage PCB that is connected to a main PCB. The cage assembly and the pluggable optic are pressed toward the heat exchanger by one or more springs positioned between the cage PCB and an opposing wall that extends from a front face of the faceplate parallel to the heat exchanger.

By pressing the cage assembly and pluggable optic towards the heat exchanger connected or integrated into the faceplate, any gaps present due to tolerances of the components of the cage assembly, faceplate, and pluggable optic can be avoided to ensure that there is thermal contact between the surfaces of the pluggable optic and the heat exchanger and to minimize thermal resistance between the pluggable optic and the heat exchanger.

For a finned heat exchanger, the shared heat exchanger allows for a significant increase in the finned area interfacing with cooling air to improve cooling. For a liquid cooled heat exchanger, a single cooling line can be used for the shared heat exchanger, which can reduce the complexity of the cooling configurations, such as by reducing the number of connections, manifolds, and the like to supply the cooling liquid to the heat exchanger.

Sometimes a circuit pack has space allocation for many different pluggable optics operating at different rates, where higher rate and higher reach pluggable optic dissipate more power. If the use of higher rate pluggable optics eliminates the need for its neighboring pluggable optic to avoid oversubscribing the bandwidth of the circuit pack, then that port will remain empty, but capped at the faceplate with a standard dust cap. In this case the area of the heat exchanger from the empty neighbor can be used to cool the hotter pluggable optic, where it could not otherwise be cooled with the heat exchanger space available.

Also, the present disclosure utilizes various terms in the art such as module and card. Those of ordinary skill in the art will recognize these terms may be used interchangeably. Further, these do not require removability. That is, a module or card may be fixed in a platform. On the other hand, an interface card or a pluggable module (again these terms may be used interchangeably) is selectively removable from a cage, slot, etc. in the platform. Also, the term platform is used herein to denote a hardware device housing the modules or cards. The platform may include a shelf, chassis, rack-mounted unit, "pizza box," etc.

Figure 1:
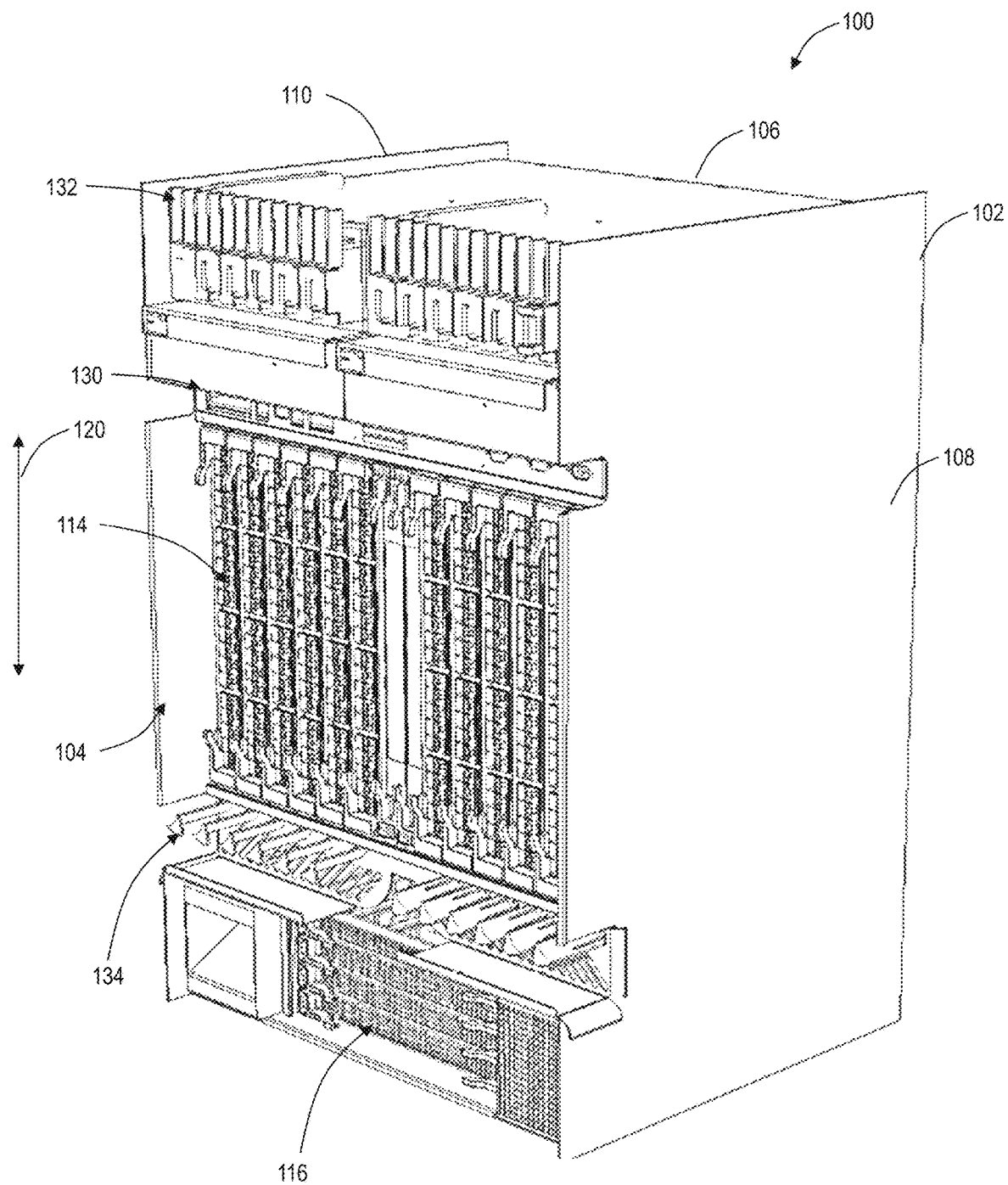
FIGS. 1-4 are various perspective diagrams of a platform.
Figure 2:
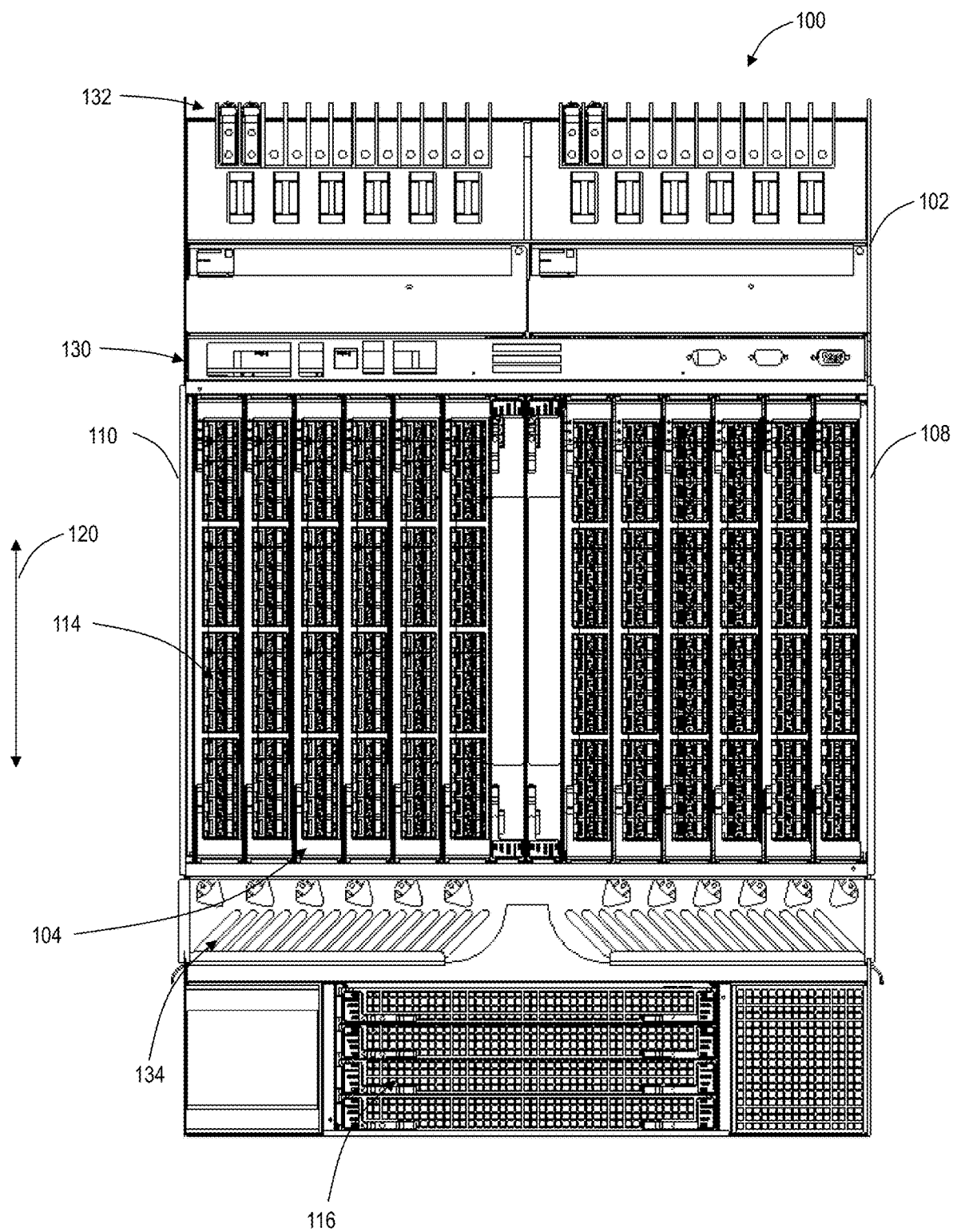
Figure 3:
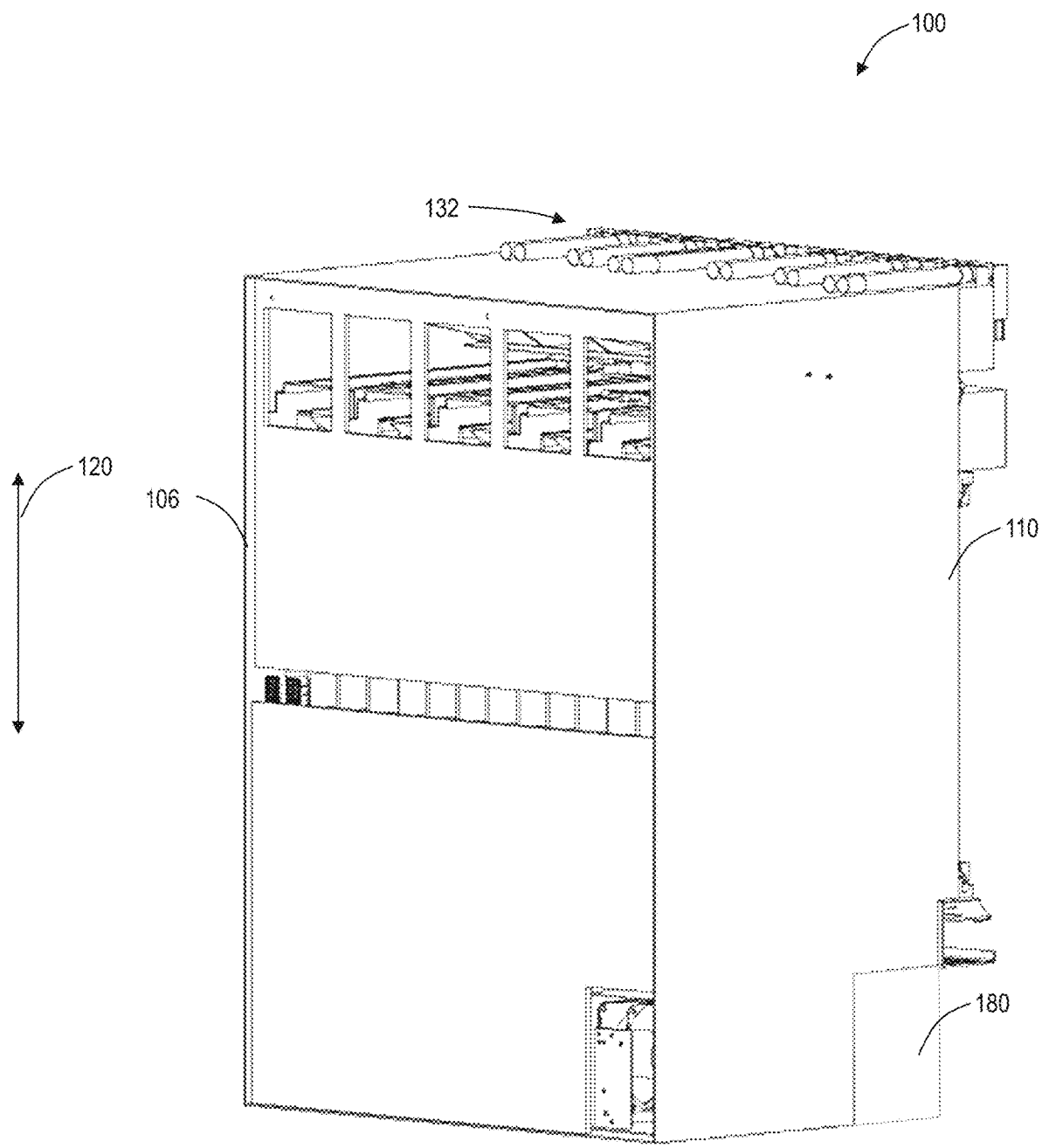
Figure 4:
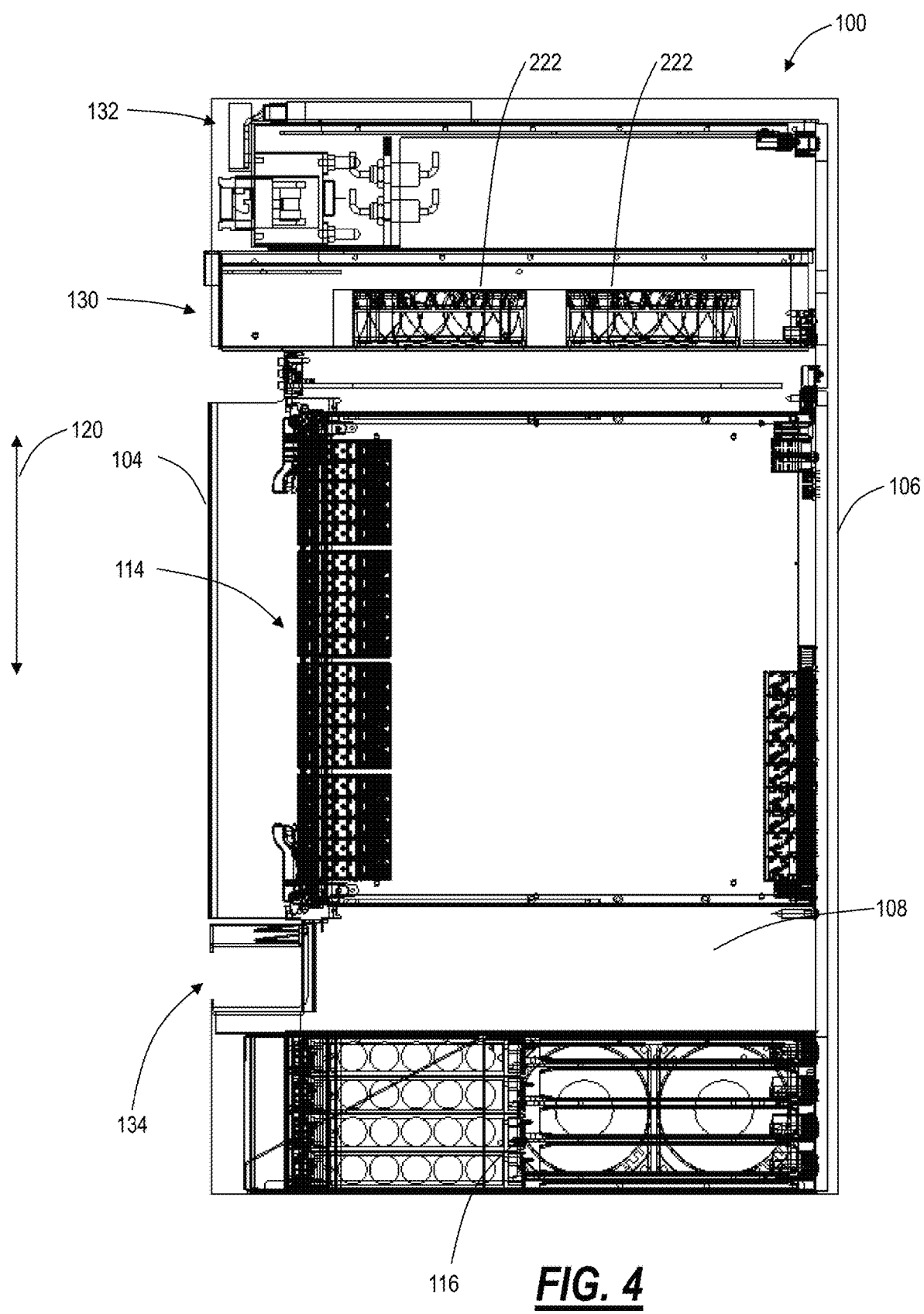

FIGS. 1-4 are various perspective diagrams of a platform 100. FIG. 1 is a front perspective diagram of the platform 100, FIG. 2 is a front view of the platform 100, FIG. 3 is a rear perspective diagram of the platform 100, and FIG. 4 is an internal cross-sectional diagram of the platform 100. FIGS. 1-4 are from commonly-assigned U.S. Pat. No. 9,769,959, issued Sep. 19, 2017, and entitled "HIGH DENSITY NETWORKING SHELF AND SYSTEM," the contents of which are incorporated herein by reference. The platform 100 can be a shelf, a system, etc. forming a network element, a node, etc. in a network. The platform 100 can include front and rear air intake/exhaust without side ventilation, thereby maintaining NEBS compliance. Additionally, the platform 100 is a half-rack system that is scalable to a double (full rack) sized system. The platform 100 is presented as an example for illustration purposes. Those skilled in the art will recognize other physical embodiments are contemplated. That is, the present disclosure contemplates use with any hardware platform having pluggable modules.

In an embodiment, the platform 100 can be a network element that may consolidate the functionality of a Multi-Service Provisioning Platform (MSPP), Digital Cross-Connect (DCS), Ethernet and/or Optical Transport Network (OTN) switch, Dense Wave Division Multiplexing (DWDM) platform, etc. into a single, high-capacity intelligent switching system providing Layer 0, 1, and 2 consolidation. In another exemplary embodiment, the platform 100 can be any of an OTN Add/Drop Multiplexer (ADM), a SONET/SDH/OTN ADM, a MSPP, a DCS, an optical cross-connect, an optical switch, a router, a switch, a DWDM terminal, wireless backhaul terminal, an access/aggregation device, etc. That is, the platform 100 can be any digital and/or optical system with ingress and egress signals and switching therebetween of channels, timeslots, tributary units, packets, etc. utilizing OTN, SONET, SDH, Ethernet, IP, etc. In another embodiment, the platform 100 can be a high-rate Ethernet switch. In a further embodiment, the platform 100 can be a DWDM terminal. In yet another embodiment, the platform 100 can be a compute, wireless, storage, or another type of hardware platform. The key aspect of the platform 100 with the present disclosure and any other platform are the front faceplate openings, via interface cards 114 in a cage.

The platform 100 includes a housing 102 which can refer to any shelf, rack, cabinet, case, frame, chassis, or other apparatus used to arrange and/or support a plurality of electronic/optical components such as removable cards, including modules with interface cards 114 and switch fabric cards 116. The housing 102 may be metal, plastic, or combination, or other suitable material and similar in construction to other housings, cabinets and/or racks used to hold electronic/optical components in place. Further, the housing 102 may be rack mounted in an ETSI, ANSI, etc. compliant rack or frame, as well as being deployed in a cabinet, etc. The housing 102 has a front side 104, a rear side 106 opposite the front side 104, a right side 108 adjacent to both the front side 104 and the rear side 106, and a left side 110 opposite the right side and adjacent to both the front side 104 and the rear side 106. Airflow in the platform 100 is between the front side 104 and the rear side 106; there may be no airflow through or between the sides 108, 110.

The housing 102 supports a set of interface cards 114 and, optionally, a set of switch fabric cards 116. The interface cards 114 are arranged in a first direction 120. The switch fabric cards 116 are arranged substantially orthogonally, i.e., perpendicular, to the first direction 120. In this embodiment, the interface cards 114 are vertically aligned, and the switch fabric cards 116 are horizontally aligned. The cards 114, 116 may optionally be surrounded by a separate metallic Faraday Cage including, for example, a metal mesh screen. The orthogonal arrangement of the switch fabric cards 116 as compared with the interface cards 114 can form a recessed portion.

The interface cards 114 can include selectively inserted pluggable optical transceivers (can also be called pluggable electro-optical transceivers. Again, the interface cards 114 can be referred to as line cards, line blades, I/O modules, etc. and can include a plurality of optical modules in the front.

For example, the optical modules can be pluggable modules such as, without limitation, XFP, SFP, XENPAK, X2, CFP, CFP2, CFP4, QSFP, QSFP+, QSFP28, OSFP, QSFP-DD, and the like. Further, the interface cards 114 can include a plurality of optical connections per module. The interface cards 114 can include wavelength division multiplexing interfaces, short-reach interfaces, and the like, and can connect to other interface cards 114 on remote network elements, end clients, edge routers, and the like.

From a logical perspective, the interface cards 114 provide ingress and egress ports to the platform 100, and each interface card 114 can include one or more physical ports. The optional switch fabric cards 116 are configured to switch channels, timeslots, tributary units, packets, cells, etc. between the interface cards 114. The interface cards 114 and/or the switch fabric cards 116 can include redundancy as well, such as 1:1, 1:N, etc. In an embodiment, the high-density platform 100 can be 15-16RU with 12 slots for line modules housing the interface cards 114 and 4 slots for the switch fabric cards 116. Here, the high-density platform 100 with a circuit pack of twelve can dissipate between 600-750 W. Further, the switch fabric cards 116 can be single fabric or double fabric (with additional pins to the backplane from the single fabric). Additionally, the platform 100 contemplates operation in an ETSI, ANSI, 19", or 23" rack or frame.

The platform 100 can include common equipment 130, power connections 132, and a fiber manager 134. The common equipment 130 is utilized for Operations, Administration, Maintenance, and Provisioning (OAM&P) access; user interface ports; and the like. The platform 100 can include an interface for communicatively coupling the common equipment 130, the interface cards 114, and the switch fabric cards 116 therebetween. For example, the interface can be a backplane, midplane, a bus, optical or electrical connectors, or the like. The interface cards 114 are configured to provide ingress and egress to the platform 100.

Those of ordinary skill in the art will recognize the platform 100 can include other components which are omitted for illustration purposes, and that the systems and methods described herein are contemplated for use with a plurality of different network elements with the platform 100 presented as an example type of network device or hardware platform. For the high-density platform 100, other architectures providing ingress, egress, and switching therebetween are also contemplated for the systems and methods described herein. Those of ordinary skill in the art will recognize the systems and methods can be used for practically any type of network device which includes interface cards 114 on the front faceplate.

The platform 100 includes a housing with a front side, a rear side opposite the front side, a right side adjacent to both the front side and the rear side, and a left side opposite the right side and adjacent to both the front side and the rear side. One or more modules in the housing each including a plurality of cages supporting removable interface cards. The removable interface cards can be pluggable optical modules.

Figure 5:
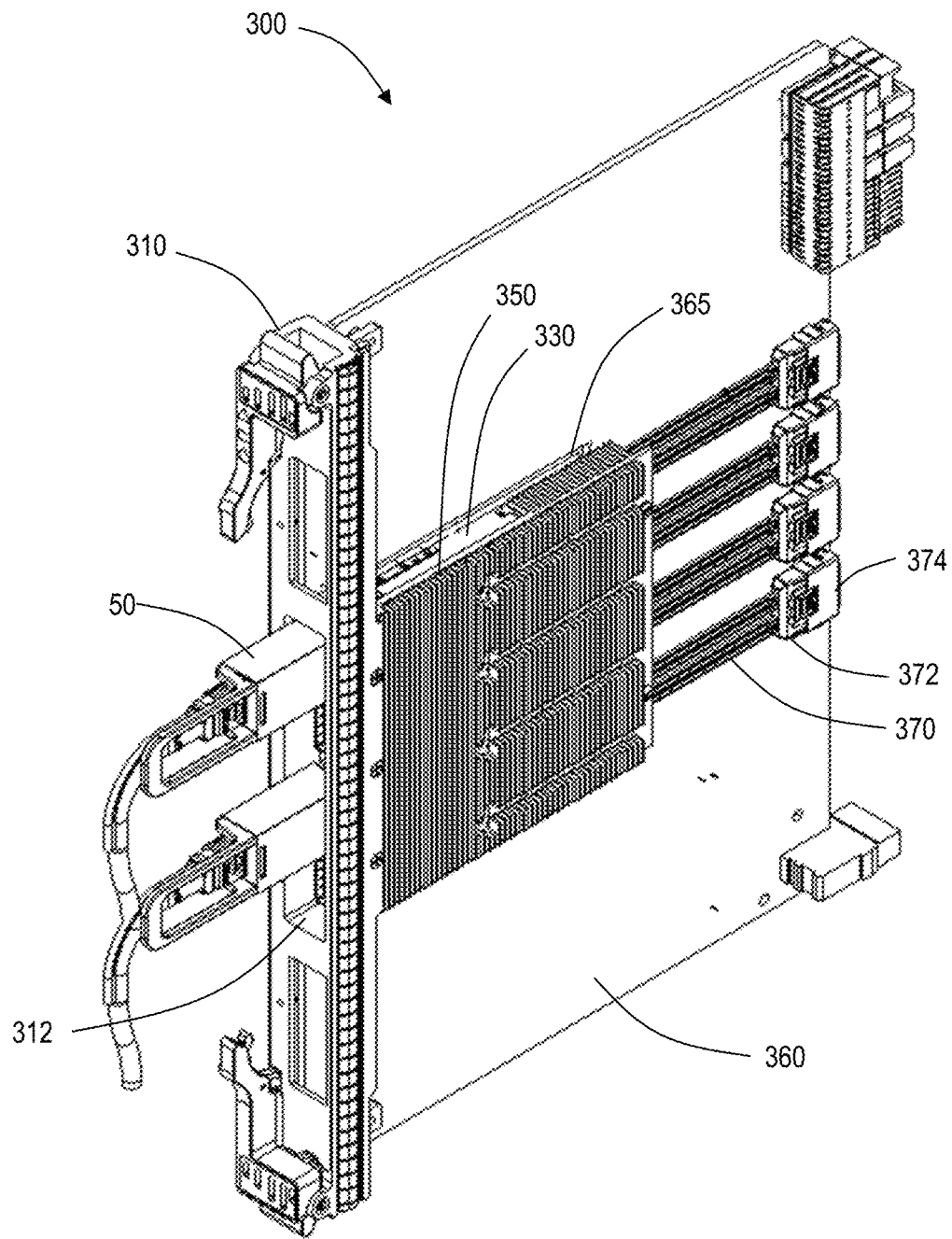
FIG. 5 is a perspective diagram of a module with multiple cage assemblies and a shared heat exchanger for multiple pluggable optical modules, and of multiple pluggable optical modules.
Figure 6:
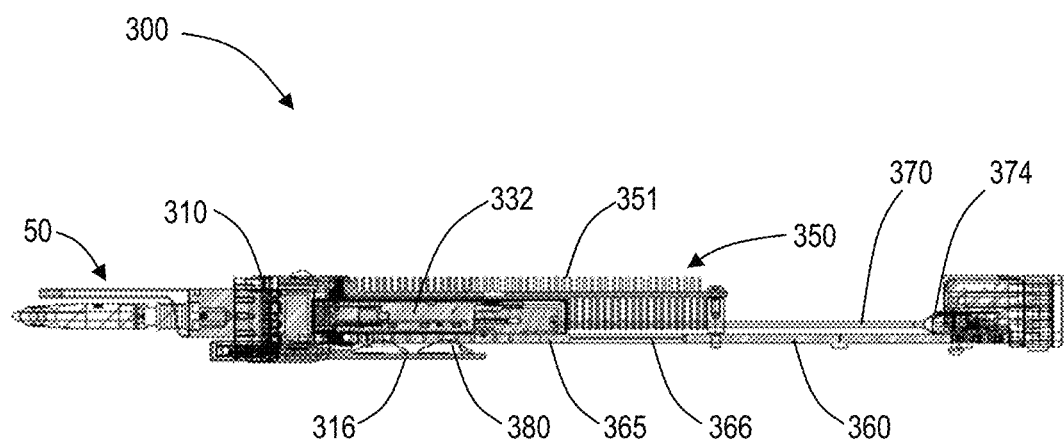
FIG. 6 is a cross-sectional diagram of the module, and a pluggable optical module of FIG. 5.
Figure 7:
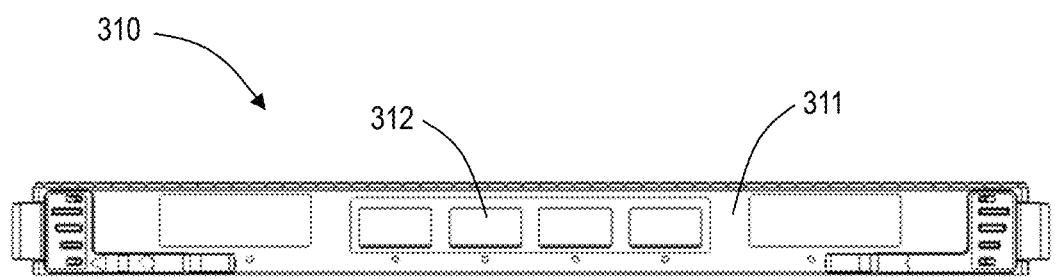
FIG. 7 is a front perspective diagram of the module of FIG. 5.

FIG. 5 is a perspective diagram of a module 300 with multiple cage assemblies 330 and a shared heat exchanger 350 for multiple pluggable optical modules 50, and of multiple pluggable optical modules 50, FIG. 6 is a cross-sectional diagram of the module 300, and a pluggable optical module 50 of FIG. 5, and FIG. 7 is a front perspective diagram of the module 300 of FIG. 5.

As can be seen in FIGS. 5-7, the module 300 includes a faceplate 310, multiple cage assemblies 330, springs 380, a shared heat exchanger 350, a main PCB 360, cables 370, and connectors 372. Pluggable optical modules 50 can be received in cages 332 of the cage assemblies 330 via one or more openings 312 in a front face 311 of the faceplate 310. The main PCB 360 can be affixed to the faceplate 310. The cage assemblies 330 can be connected to the main PCB 360 via cables 370 with connection ends 372 that mate with connectors 374 affixed to the main PCB 360. One or more springs 380 are positioned between each cage assembly 330 and a wall 316 of the faceplate. The one or more springs 380 bias the cage assembly 330 towards the heat exchanger 350 to press the pluggable optical module 50 against a mating surface 354 of the heat exchanger 350.

Figure 8:
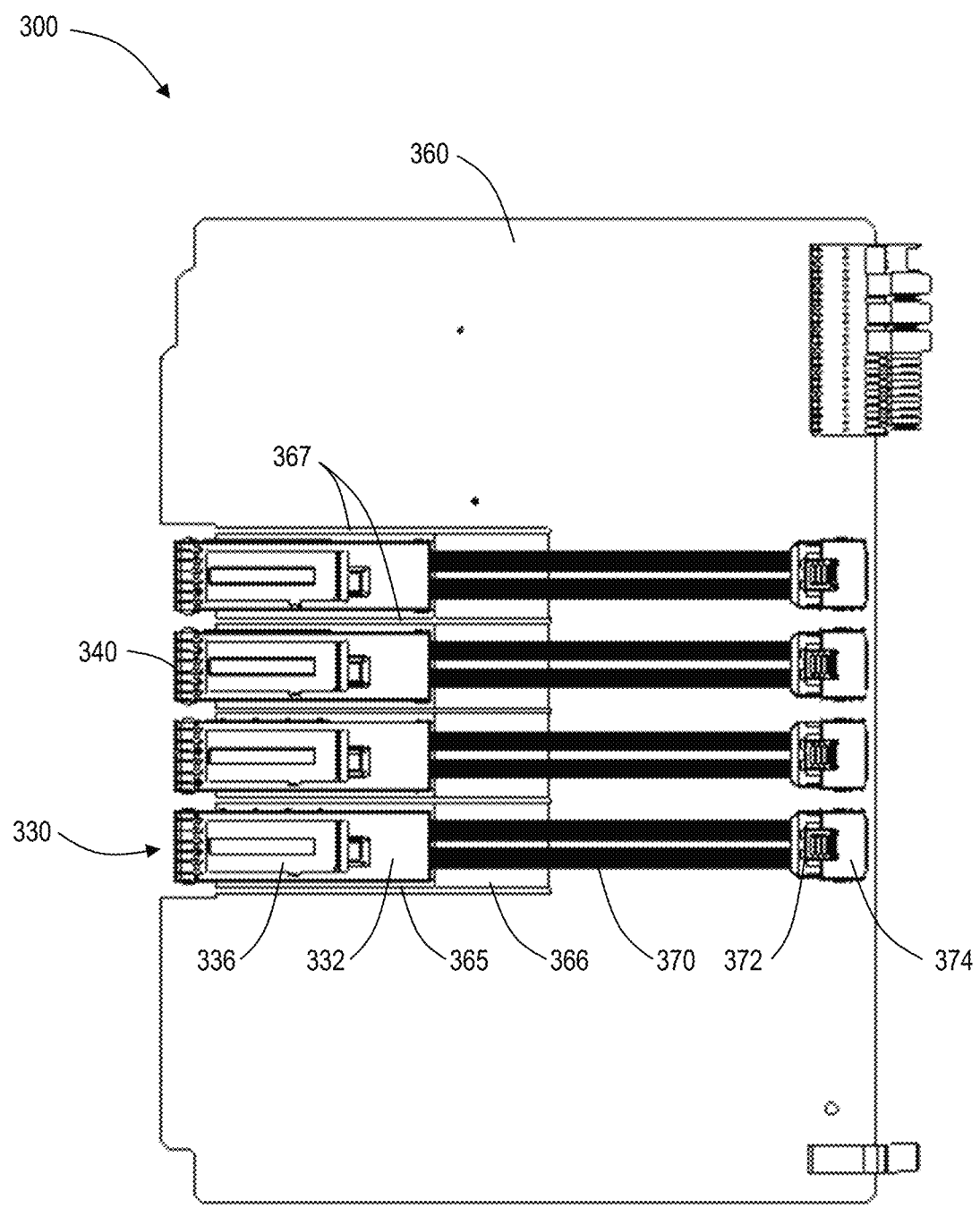
FIG. 8 is a top perspective diagram of the module of FIG. 5 with the faceplate and the heat exchanger removed.
Figure 9:
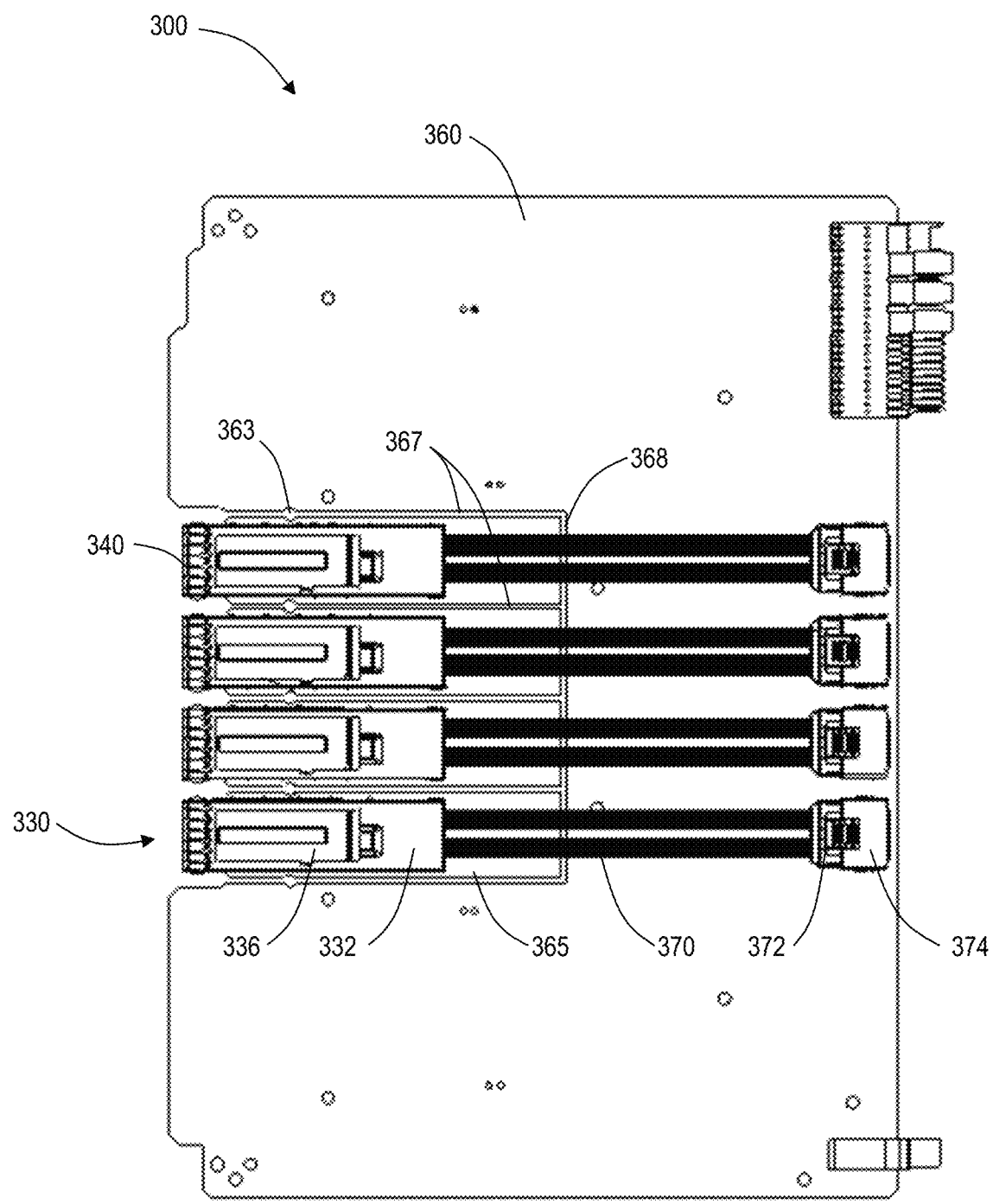
FIG. 9 is a top perspective diagram of the module of FIG. 5 with a floating Printed Circuit Board (PCB) for each cage and with the faceplate and the heat exchanger removed.
Figure 10:
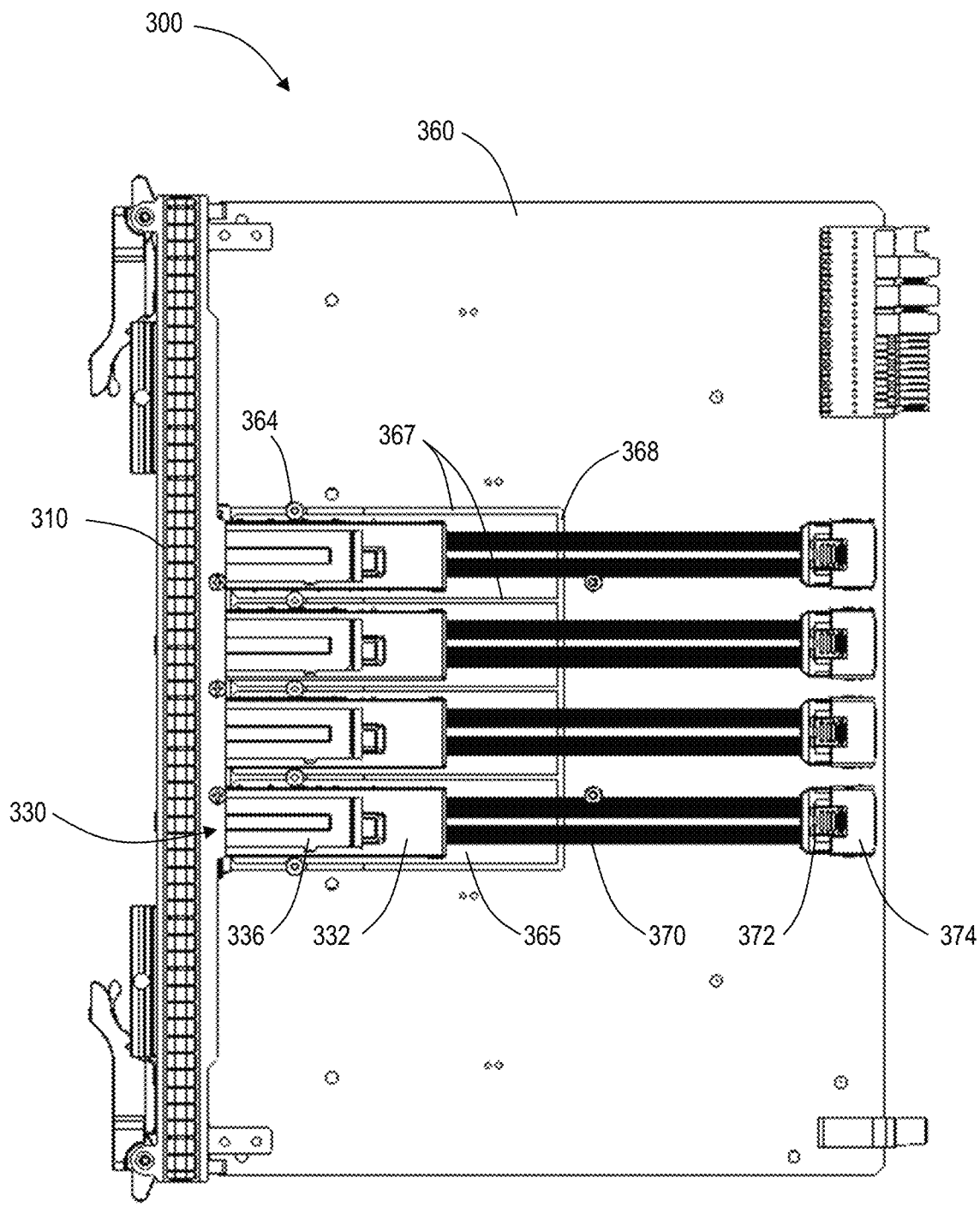
FIG. 10 is the top perspective diagram of the module of FIG. 8 including the faceplate.

FIG. 8 is a top perspective diagram of the module 300 of FIG. 5 with the faceplate 310 and the heat exchanger 350 removed. FIG. 9 is a top perspective diagram of the module 300 of FIG. 5 with a cage PCB 365 for each cage 332 and with the faceplate 310 and the heat exchanger 350 removed. FIG. 10 is the top perspective diagram of the module 300 of FIG. 9 including the faceplate 310.

As can be seen in FIGS. 8-10, each cage assembly 330 includes a cage 332 and a cage PCB 365. The cage 332 is affixed to the cage PCB 365. The cable 370 can also be included in the cage assembly 330. Each cage PCB 365 is sized such that the module 300 includes slots 367 positioned laterally between adjacent cage PCBs 365 and laterally between each cage PCB 365 at an end of the array of cage assemblies 330 and the main PCB 360.

As can be seen in FIGS. 6 and 8, an end of each cage PCB 365 can be connected to the main PCB 360 via a rigid flex portion 366. The rigid flex portion 366 can be a PCB that is thinner than the main PCB 360 and the cage PCB, and may be a portion of the main PCB 360 that is milled on one or more sides, which can allow the cage PCB 365 to move vertically (transverse to the direction of the slots) such that the cage assembly 330 can be biased towards the heat exchanger 350. While high speed connections can be made to the main PCB 360 from the cage assembly 330 via cables 370, remaining signals, such as those that are low speed, can track to the main PCB 360 via the rigid flex portion 366.

In some embodiments, one or more of the PCBs and rigid flex portion 366 can be capable of transferring hi-speeds signals therebetween, and can comprise multiple flexible circuits attached together, such as Rigid Flex PCBs. In one embodiment, the main PCB 360 and each cage PCB 365 can be a rigid PCB, while each rigid flex portion 366 is a flexible circuit attached to the main PCB 360 and a cage PCB 365. The rigid PCBs and the flexible circuits can be integrated together into one circuit. In these embodiments, the cables 370 can be eliminated.

As can be seen in FIGS. 9 and 10, the end of each cage PCB 365 can also be separated from the main PCB 360 via a slot 368, such that each cage PCB 365 is floating. Each cage PCB 365 can be aligned with respect to the faceplate 310 with aligners 364, such as pins or shoulder screws, that mate with holes 363 that are cut into the main PCB 360 and the cage PCBs 365. At least some of the holes 363 may be formed by cutting into adjacent sides of cage PCBs 365 or adjacent sides of a cage PCB 365 and the main PCB 360.

FIG. 11 is a top perspective diagram of a cage assembly 330. FIG. 12 is a front perspective diagram of the cage assembly 330 of FIG. 11. FIG. 13 is a side perspective diagram of the cage assembly 330 of FIG. 11.

As can be seen in FIGS. 11-13, the end of the cage PCB 365 can extend beyond an end to the cage 332, and the cage assembly 330 can include a connector 376 that connects the cage PCB 365 to the main PCB 360 via cables such that remaining signals, such as those that are low speed, can track to the main PCB 360. Alternatively, the end of the cage PCB 365 that is floating due to the slots 368 can also be connected via a rigid flex portion 366 or can be connected via a combination of the connector 376 and a rigid flex portion 366.

The cage 332 can include a body 334 shaped to receive a pluggable optical module 50 and that is connected to the cage PCB 365. The cage 332 can also include a cutout 336 in the body 334 that cuts back a top of the cage 332, which can be opposite the cage PCB 365. The cutout 336 is configured to allow for a portion of the shared heat exchanger 350 to sit therein and have continuous contact with the pluggable optical module 50 received in the body 334.

The cage 332 can further include a gasket 340 positioned at an open end of the body 334. The gasket 340 can be an EMI (electromagnetic interference) type gasket. As can be seen in FIGS. 8, 9 and 12, the gasket 340 can be positioned within a flange 342 of the body 332, a spring type gasket, and the like.

Figure 14:
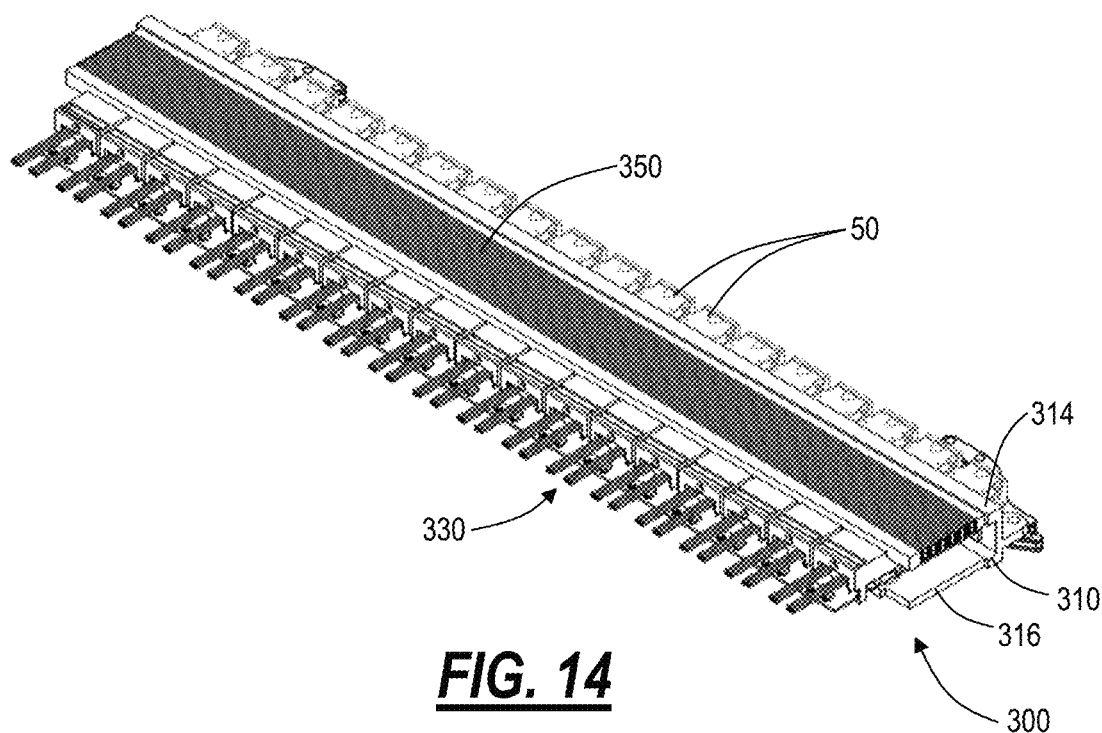
FIG. 14 is a perspective diagram of the faceplate including the heat exchanger and multiple cage assemblies inserted therein.
Figure 15:
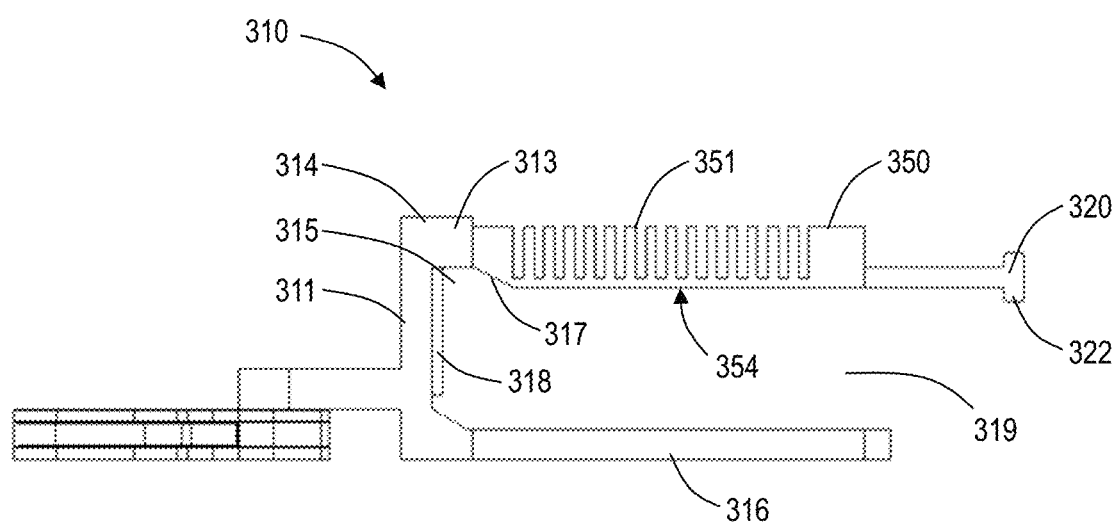
FIG. 15 is a side perspective diagram of the faceplate and heat exchanger of FIG. 14.

FIG. 14 is a perspective diagram of the faceplate 310 including the heat exchanger 350 and multiple cage assemblies 330 inserted therein, and FIG. 15 is a side perspective diagram of the faceplate 310 and heat exchanger 350 of FIG. 14.

As can be seen in FIGS. 14 and 15, the faceplate 310 can include a front face 311, a first wall 314 extending from the front face 311, a second wall 316 extending from the front face 311, and a hook 320. The first wall 314 can include a lip 313 and the heat exchanger 350. The lip 313 and the heat exchanger 350 can be shaped to form a recess 315, which can be configured to receive an upper portion of the cage 332, such as an upper portion of the flange 342. The first wall 314 can also include a chamfer 317 opposite the front face 311 relative to the recess 315. The chamfer 317 can also be adjacent a mating surface 354 of the heat exchanger 350, the mating surface 354 being configured to contact a surface of the pluggable optical module 50.

The heat exchanger 350 can be a cold plate, a heatsink, and the like. As illustrated in FIGS. 14 and 15, the heat exchanger 350 can include fins 351 or other shapes. All or portions of the heat exchanger 350 can be formed integrally with the first wall 314 or can be formed separately and integrally joined to the remainder of the first wall 314.

The second wall 316 can extend parallel to the first wall 314 and is offset from the first wall 314. The front face 311, the first wall 314, and the second wall 316 form a volume 319 for receiving multiple cage assemblies 330. The second wall 316 is opposite the first wall 314 relative to the volume 319.

The hook 320 is positioned opposite the front face 311 and includes a protrusion 322 that is configured to apply a gasket force to the cage 332, such as forcing the cage into a compressible gasket or to locate the cage 332 with a spring type gasket. The hook 322 can be at an end of the first wall 314 and can extend from the heat exchanger 350 as shown in FIG. 15 or can be at an end of the second wall 316. The hook 322 can extend further than the opposing wall so that the protrusion 322 is positioned further from the front face 311 than an end of the opposing wall.

The faceplate 310 can also include one or more gaskets 318 positioned within the one or more openings 312 in the front face 311.

The faceplate 310 can be configured to receive a single row of cage assemblies 330 and pluggable optical modules 50 or can be configured to receive multiple rows of cage assemblies 330 and pluggable optical modules 50.

Figure 16:
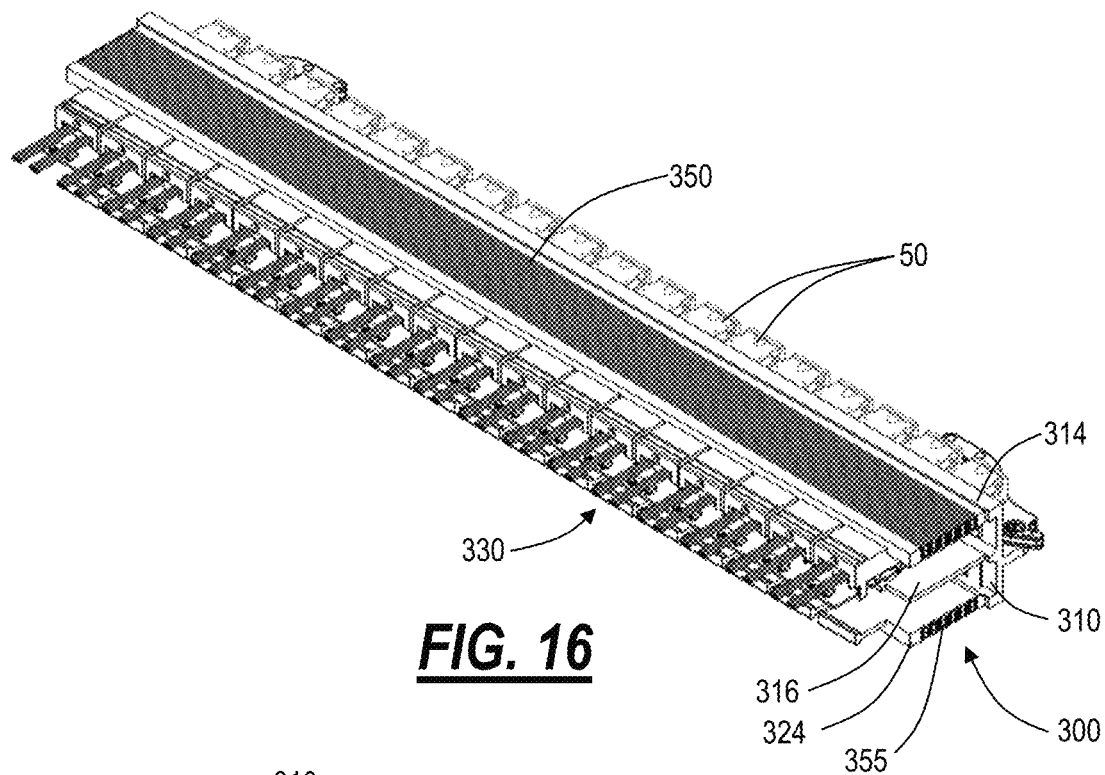
FIG. 16 is a perspective diagram of a module with multiple rows, and multiple pluggable optical modules.
Figure 17:
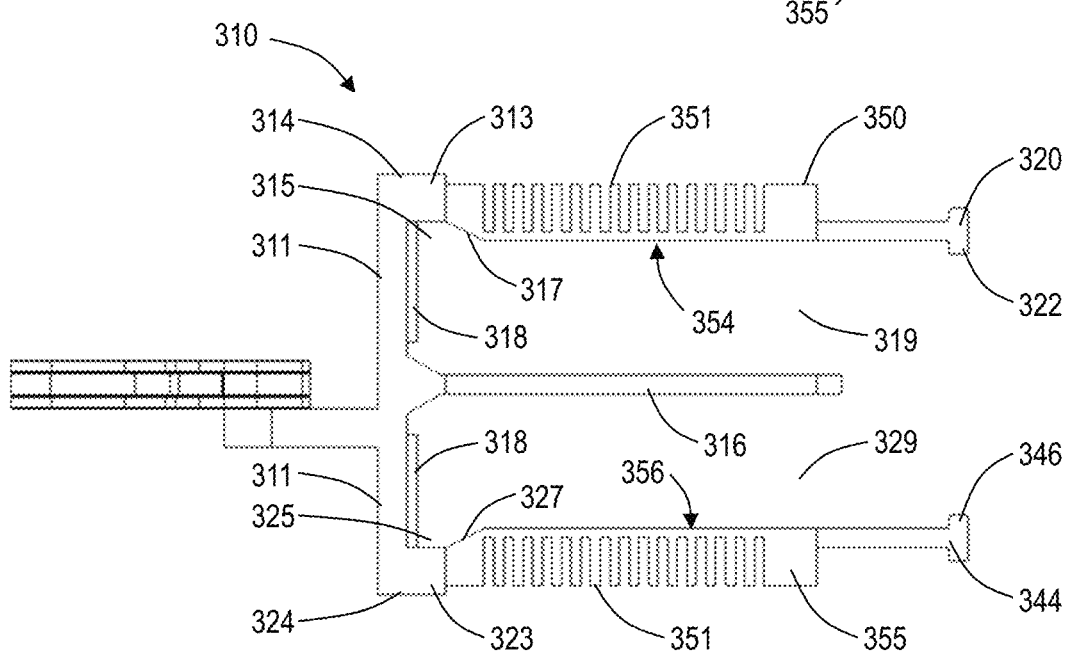
FIG. 17 is a side perspective diagram of the faceplate of FIG. 16.
Figure 18:
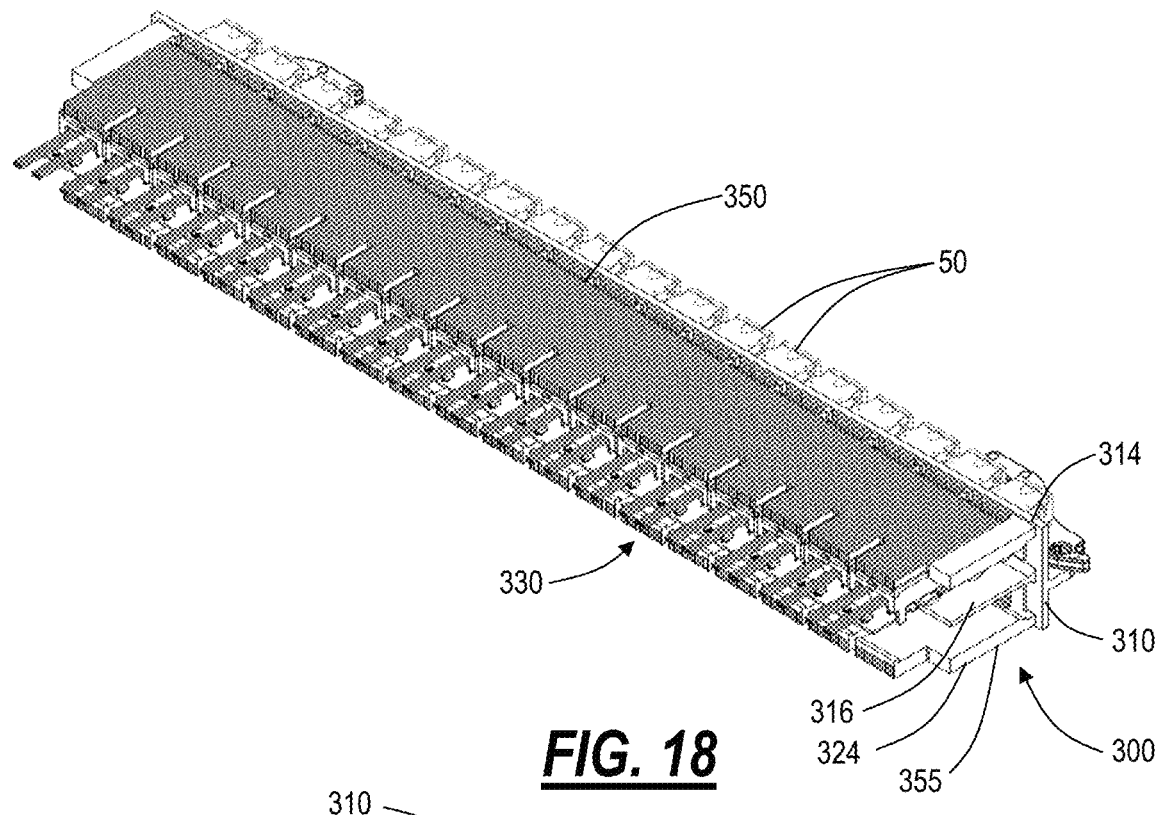
FIG. 18 is a perspective diagram of a module with multiple rows, and multiple pluggable optical modules.
Figure 19:
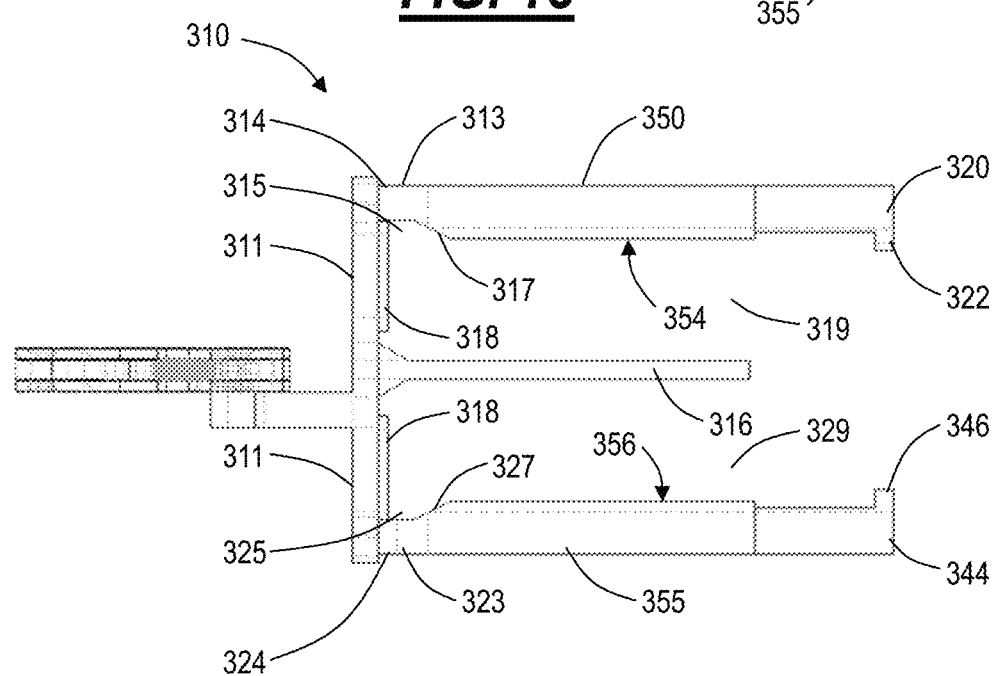
FIG. 19 is a side perspective diagram of the faceplate of FIG. 18.
Figure 20:
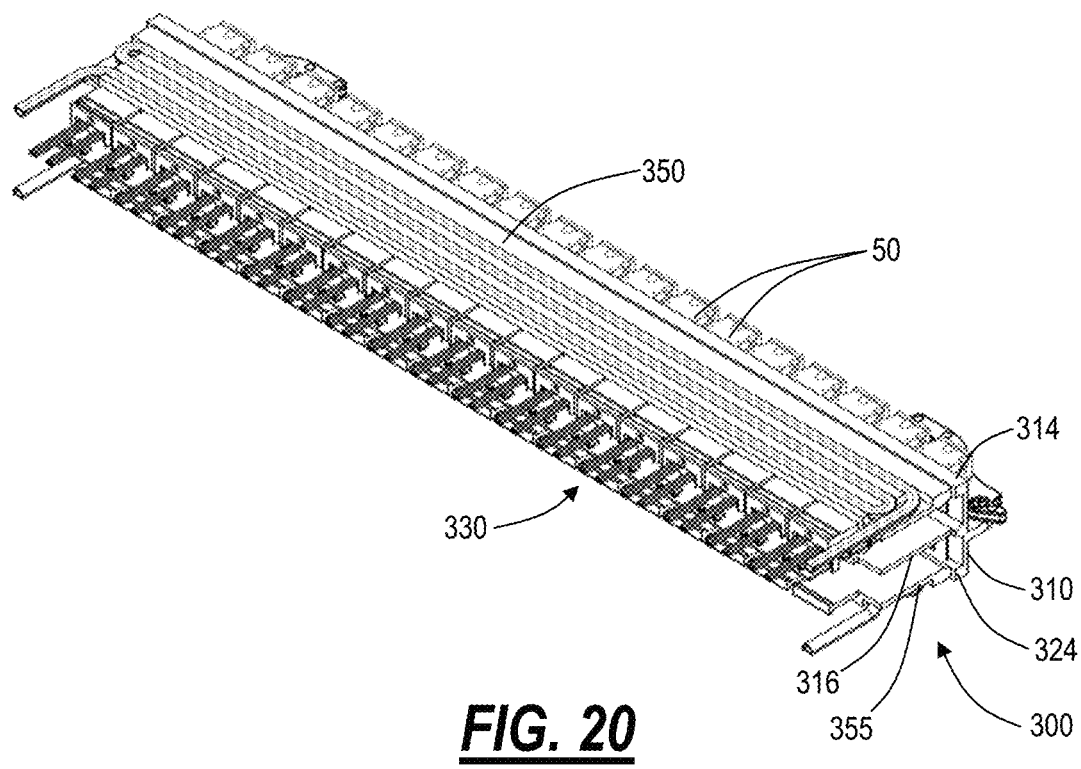
FIG. 20 is a perspective diagram of a module with multiple rows, and multiple pluggable optical modules configured for liquid cooling.
Figure 21:
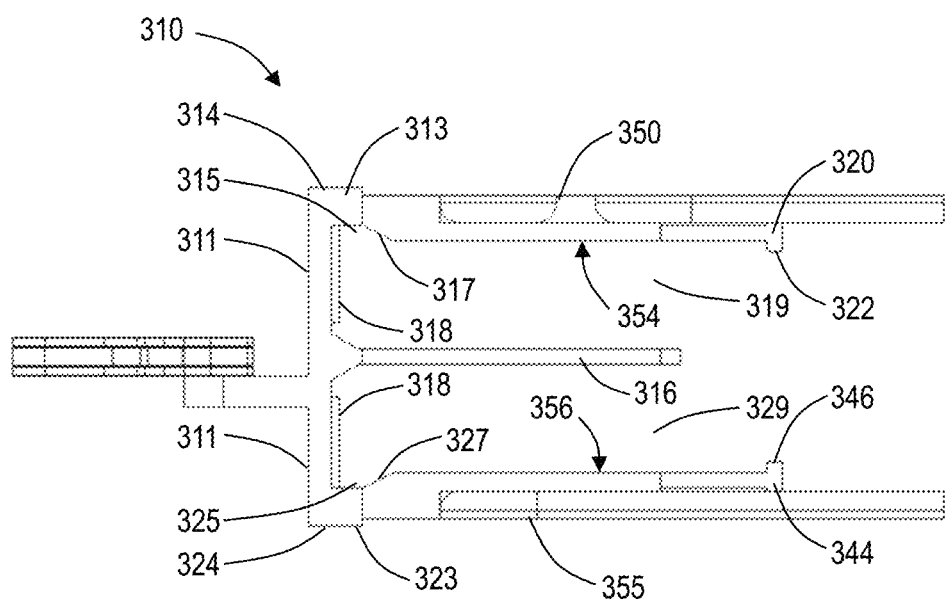
FIG. 21 is a side perspective diagram of the faceplate of FIG. 20.

FIGS. 16, 18, and 20 are perspective diagrams of modules with multiple rows, multiple cage assemblies, and multiple pluggable optical modules. FIGS. 17, 19, and 21 are side perspective diagrams of the modules of FIGS. 16, 18, and 20 respectively.

As can be seen in FIGS. 16-21, the faceplate 330 can include a third wall 324 and a second hook 344, which can be integral to the third wall 324. The third wall can extend from the front face 311 parallel to the first wall 314 and the second wall 316. The third wall 324 can be symmetrical to the first wall 314 relative to the second wall 316 (such as a mirror image of the first wall 314).

The third wall 324 can include a lip 323 and a second heat exchanger 355. The lip 346 and the second heat exchanger 355 can be shaped to form a recess 325, which can be configured to receive an upper portion of the cage 332, such as an upper portion of the flange 342. The third wall 324 can also include a chamfer 327 opposite the front face 311 relative to the recess 325. The chamfer 327 can also be adjacent a mating surface 356 of the second heat exchanger 355, the mating surface 356 being configured to contact a surface of the pluggable optical module 50.

The front face 311, the third wall 324, and the second wall 316 form a second volume 329 for receiving multiple cage assemblies 330. The second wall 316 is opposite the third wall 324 relative to the volume 329.

The second hook 344 is positioned opposite the front face 311 and includes a protrusion 346 that is configured to apply a gasket force to the cage 332, such as forcing the cage into a compressible gasket or to locate the cage 332 with a spring type gasket. The second hook 344 can be at an end of the third wall 314 and can extend from the heat exchanger 350. The hook 322 can extend further than the second wall 316 so that the protrusion 322 is positioned further from the front face 311 than an end of the second wall 316.

The heat exchangers 350 and 355 can be a heatsink, such as a heatsink with a plurality of fins. The fins can extend in any direction, such as transverse to the first wall 314 and the third wall 316 (see FIGS. 16 and 17) or in the same direction as the as the first wall 314 and the third wall 316 (see FIGS. 18 and 19). The heat exchangers 350 and 355 can also be a cold plate, such as a cold plate with liquid cooling. The use of each heat exchanger 350 and 355 to cool multiple pluggable optical modules 50 can reduce the complexity of the cooling configurations. For example, a cold plate with liquid cooling that cools multiple pluggable optical modules 50 can significantly reduce the number of connections, manifolds, and the like to provide the cooling liquid to the cold plate. Other types of heat exchangers and configurations of heat exchangers are also contemplated.

Figure 22:
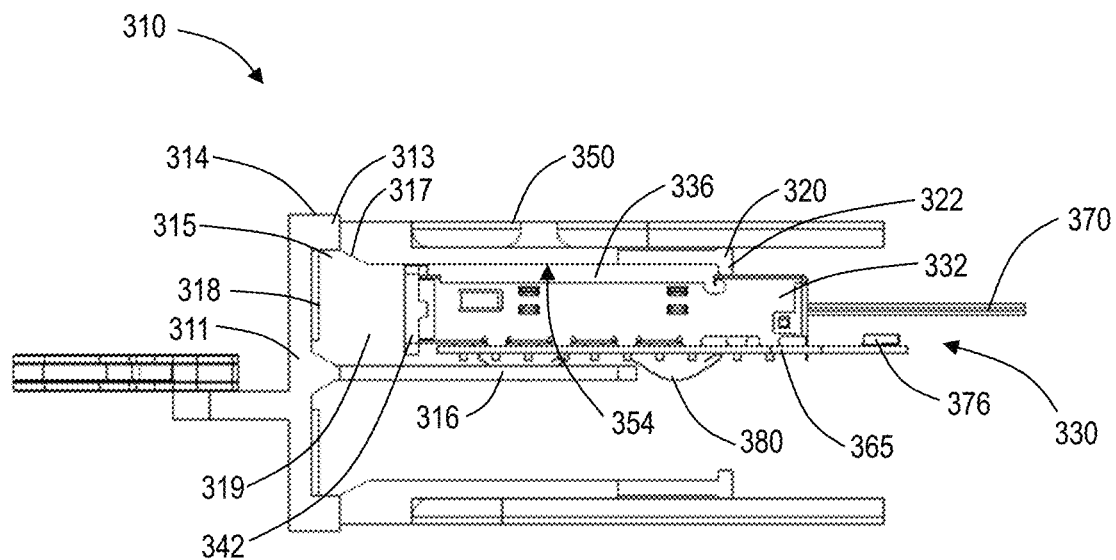
FIGS. 22 and 23 are side perspective diagrams of assembly of a module.
Figure 23:
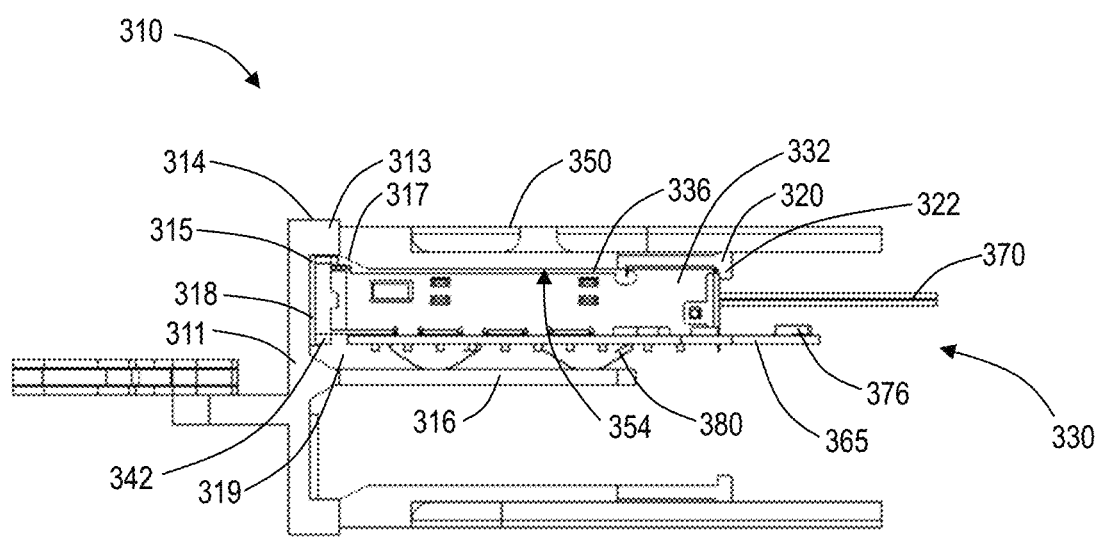

FIGS. 22 and 23 are side perspective diagrams of assembly of a module 310 and of the insertion of a cage assembly 330 into the faceplate 310. With the protrusion 322 of the hook 320 being positioned further than an end of the second wall 316, the flange 342 or any other protruding portion of the cage 332 can easily be inserted into the volume 319 passed the protrusion 322. During insertion, the one or more springs 380 are compressed between the cage PCB 365 and the second wall 316, which pushes the cage assembly 330 towards the heat exchanger 350. The cage assembly is pushed from the rear toward the gasket 318 until the cage assembly 330 clears the protrusion 322 of the hook 320, which retains the cage assembly 330 at least partially within the volume 319 and presses the cage assembly toward the front face 311 and the gasket 318. Due to the configuration of the hook 320 and the protrusion 322, the cage assembly 330 can be retained in the volume 319 without any fasteners.

The flange 342 or any other protruding portion at a front end of the cage 332 can be pressed up and received into the recess 315, and the recess 315 can be sized to receive the flange 342.

While assembly of the module 330 is described with respect to inserting a cage assembly 330 into the volume 319, inserting a cage assembly 330 into the volume 329 in the same or a similar manner.

Referring to FIGS. 6, 22, and 23, the one or more springs 380 are retained between the cage PCB 365 and the second wall 316, and can be connected to the cage PCB 365 as part of the cage assembly 330, can be connected to the second wall 316 as part of the faceplate 310, or can be an assembly separate from both cage assembly 330 and the faceplate 310 and retained in another manner. The one or more springs 380 can push off the second wall 316 to press the cage assembly 330 and the pluggable optical module 50 towards the heat exchanger 350 and can oppose any thermal contact spring force that is integrated or bolted to faceplate 310.

Figure 24:
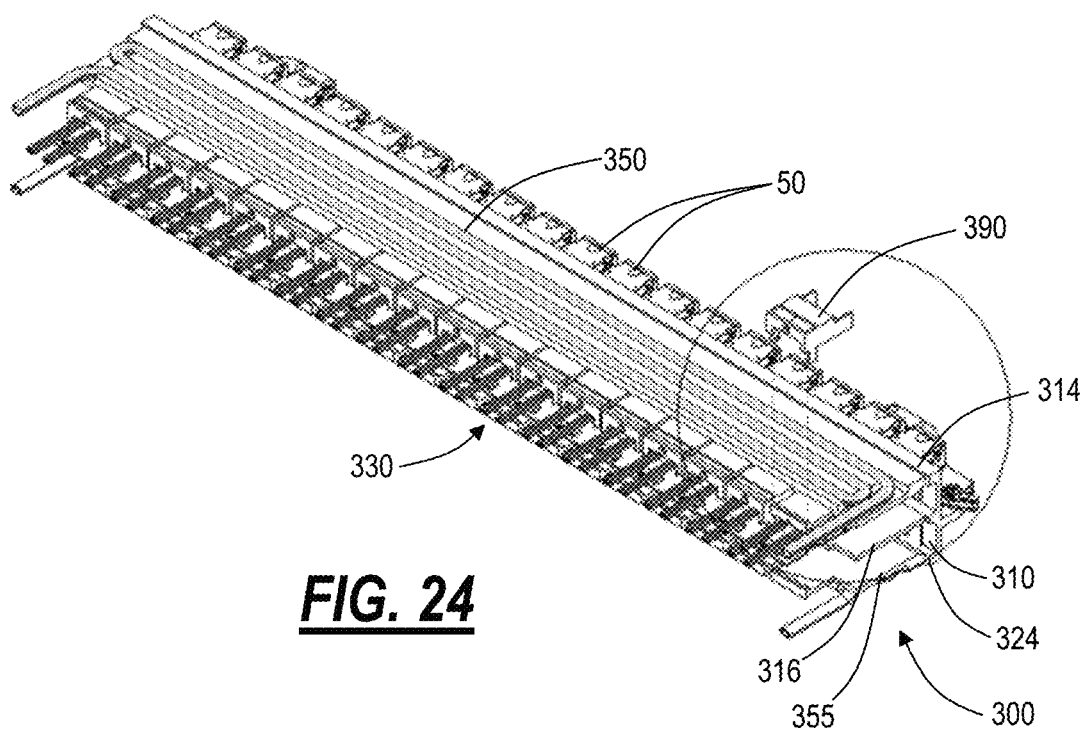
FIG. 24 is a perspective diagram of a module.
Figure 25:
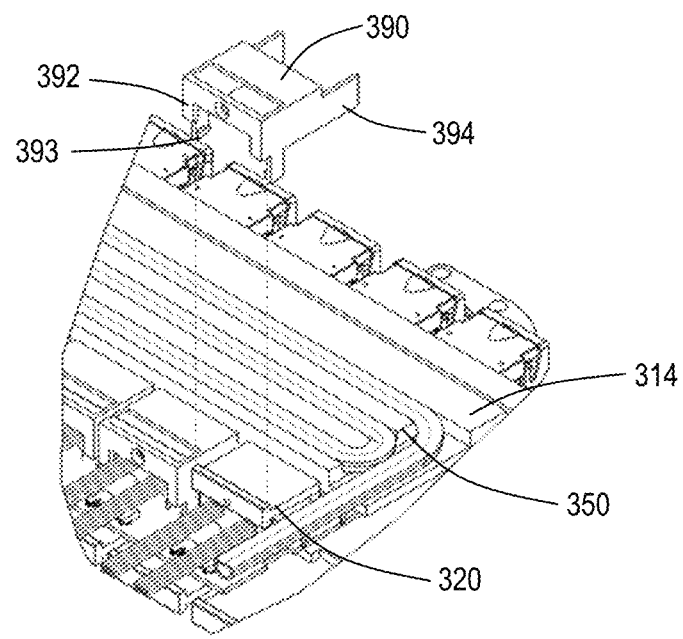
FIG. 25 is a detailed perspective diagram of a portion of the module of FIG. 24.

FIG. 24 is a perspective diagram of a module 300, and FIG. 25 is a detailed perspective diagram of a portion of the module 300 of FIG. 24. The module 300 can include positioning clips 390. The positioning clip 390 can keep the cage assembly 330 aligned with respect to the opening 312 in the front face 311 of the faceplate 310.

The module 300 can include multiple hooks 320, such that there is a single hook 320 for each cage assembly 330. The hooks 320 can be sized such that there is a gap 348 between adjacent hooks 320. The positioning clip 390 can be configured to receive a hook 320 therein and to be secured to the hook 320, such as by fastening.

The positioning clip 390 can include legs 392, each with a protruding portion 393. The legs can extend beyond the cage PCB 365 with the protruding portions 393 clipped on an opposing side of the cage PCB 365. The positioning clip 390 can also include side walls 394 that extend along the sides of the cage assembly 330 to position the cage assembly 330. The side walls 394 can also extend along and in contact with the first wall 314 including along the mating surface 354 of the heat exchanger 350.

The legs 392 and protruding portions 393 can ensure that the cage assembly 330 is properly angled in the direction of the force applied by the one or more springs 380, while the side walls 394 can ensure that the cage assembly 330 is properly centered and angled in a direction that the row of cage assemblies 330 extends.

The positioning clip 390 can be similarly configured to be assembled with the second hook 344.

Figure 26:
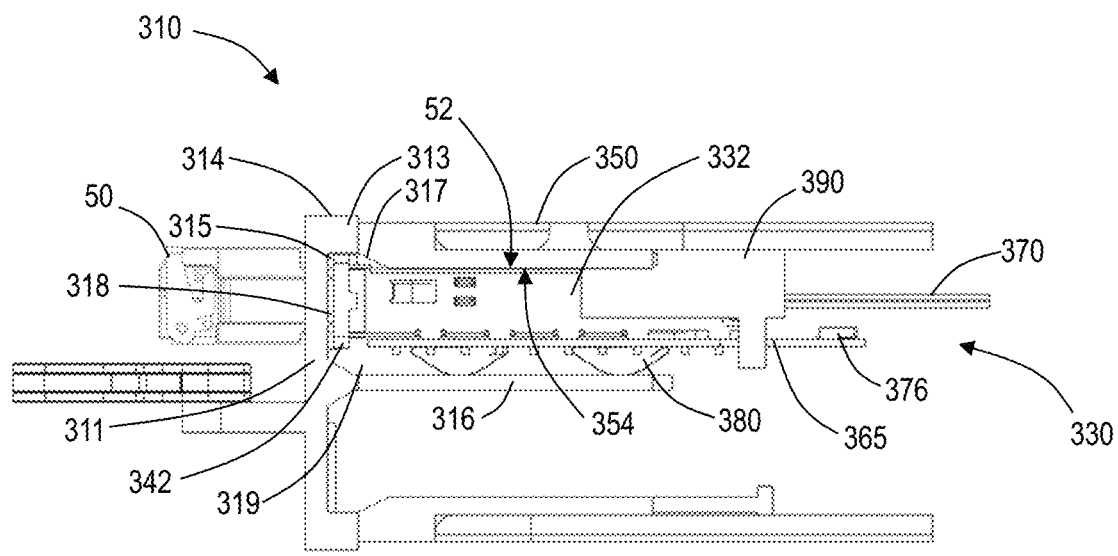
FIG. 26 is a side perspective diagram of a module with a pluggable optical module inserted therein.

FIG. 26 is a side perspective diagram of a module 300 with a pluggable optical module 50 inserted therein. While inserting the pluggable optical module 50, the chamfer 317 of the first wall 314 can act as a ramp to guide an end of the pluggable optical module 50 into the volume 319. The one or more springs 380 press against the second wall 316 and push the cage assembly 330 toward the first wall 314, pressing a contact surface 52 of the pluggable optical module 50 against a mating surface 354 of the heat exchanger 350 to ensure that there is thermal contact between the surfaces and to minimize thermal resistance between the pluggable optical module 50 and the heat exchanger 350.

Figure 27:
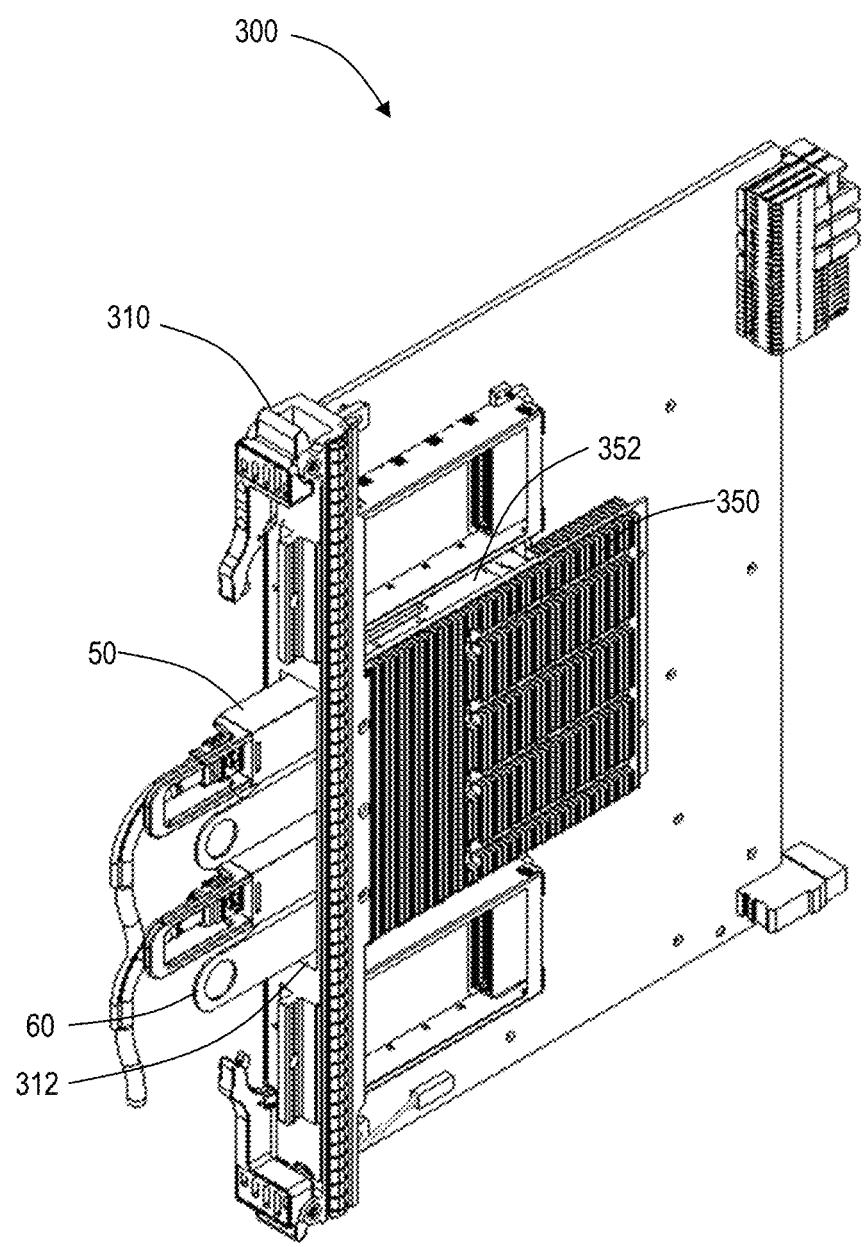
FIG. 27 is a perspective diagram of a module with a shared heat exchanger for multiple pluggable optical modules, and with pluggable heat sinks.

FIG. 27 is a perspective diagram of a module 300 with a shared heat exchanger 350 for multiple pluggable optical modules 50, and with pluggable heatsinks 60. As noted above, where a high transmission rate pluggable optical module 50 is used ports adjacent to it remain unused and the pluggable optical module 50 can be further cooled by the shared heat exchanger 350. The pluggable heatsinks 60 can be inserted into the empty cages 352 through the openings 312 in the faceplate 310, taking advantage of the unused space to assist the cooling of the pluggable optical modules 50 in occupied cages 352. Where a pluggable heatsink 60 may not be required and air ingress are not necessary, a dust cap can be inserted into the unoccupied cages 352 to prevent EMI breach.

Figure 28:
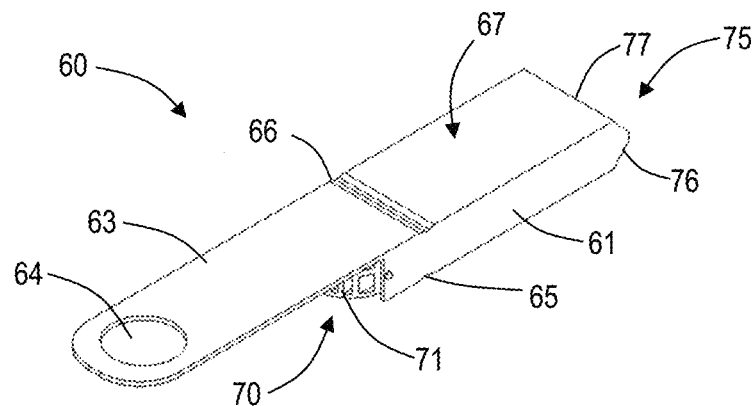
FIG. 28 is a perspective diagram of a pluggable heat sink.
Figure 29:
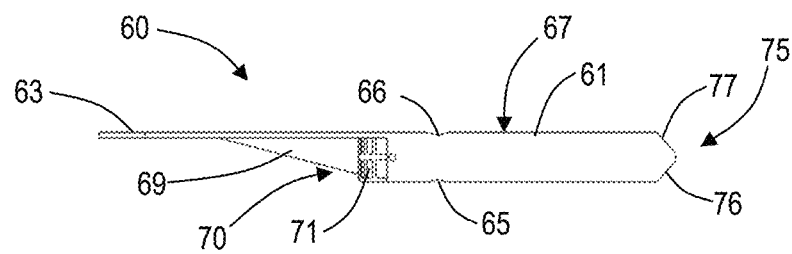
FIG. 29 is a side perspective diagram of the pluggable heat sink of FIG. 28.
Figure 30:
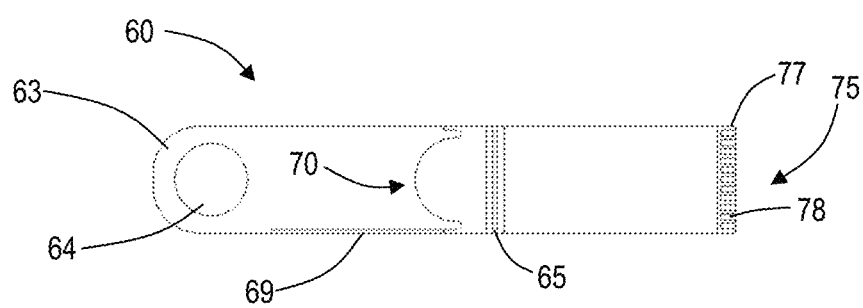
FIG. 30 is a bottom perspective diagram of the pluggable heat sink of FIG. 28.
Figure 31:
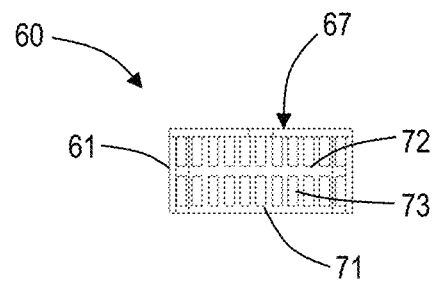
FIG. 31 is a cross-sectional diagram of the pluggable heat sink of FIG. 28.
Figure 32:
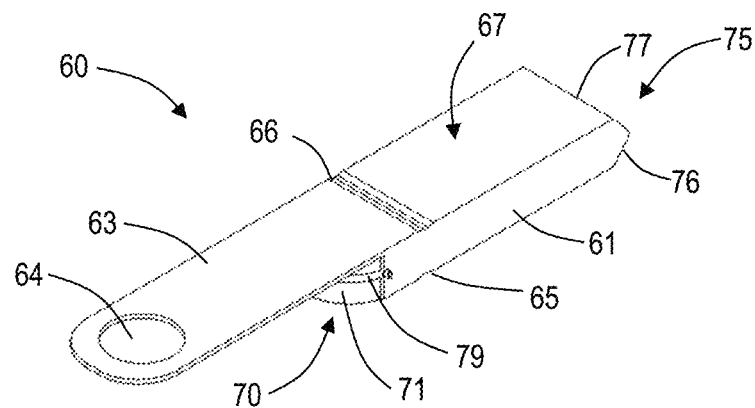
FIG. 32 is a perspective diagram of the pluggable heat sink of FIG. 28 with a removable filter.
Figure 33:
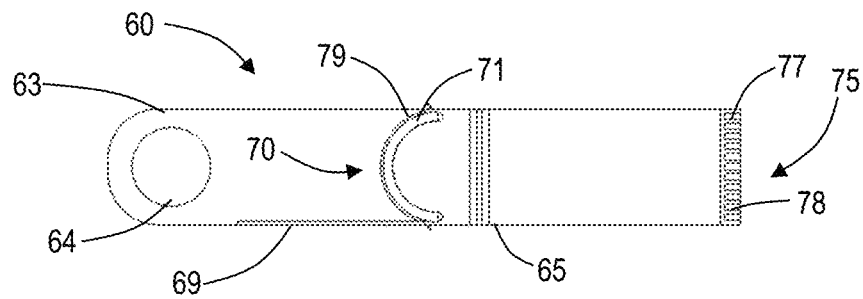
FIG. 33 is a bottom perspective diagram of the pluggable heat sink of FIG. 32.
Figure 34:
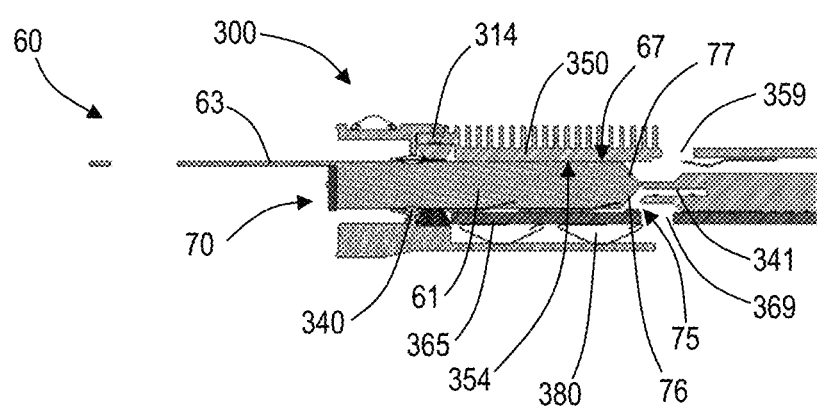
FIG. 34 is a cross-sectional diagram of the module and a pluggable heat sink of FIG. 27.

FIG. 28 is a perspective diagram of a pluggable heatsink 60. FIG. 29 is a side perspective diagram of the pluggable heatsink 60 of FIG. 28. FIG. 30 is a bottom perspective diagram of the pluggable heatsink 60 of FIG. 28. FIG. 31 is a cross-sectional diagram of the pluggable heatsink 60 of FIG. 28. FIG. 32 is a perspective diagram of the pluggable heatsink 60 of FIG. 28 with a removable filter. FIG. 33 is a bottom perspective diagram of the pluggable heatsink 60 of FIG. 32. FIG. 34 is a cross-sectional diagram of the module 300 and pluggable heatsink 60 of FIG. 27.

The pluggable heatsink 60 can include a body 61 and a handle 63. The body 61 can be sized to match the width and height of the pluggable optical modules 50 that it replaces and can be sized to ensure there is an EMI seal. The body 61 can include a contact surface, an intake end 70 that receives cooling air flowing through the platform, and an exhaust end 75 for expelling the cooling air.

The contact surface 67 can be a flat surface that is configured to contact the mating surface 354 of the heat exchanger 350. The intake end 70 can include a filter 71. The filter 71 can be removable, and can be fastened or otherwise held in place, such as by a clip 79 (refer to FIGS. 32 and 33).

The exhaust end 75 can include one or more openings 78 for the cooling air to exit through. The exhaust can also include angled surfaces 76 and 77, which can each include one or more openings 78. The angled surfaces 76 and 77 can form a wedge shape at the exhaust end and can be configured to direct the cooling air at angles relative to a length direction of the body 61. In particular, the one or more openings 78 of angled surface 76 can be configured to direct cooling air at an angle away from the contact surface 67 and the mating surface 354, while the one or more openings 78 of angled surface 77 can be configured to direct cooling air at an angle in an opposing direction, towards the mating surface 354.

The body 61 can also include grooves 65 and 66 that are adjacent the intake end 70. Groove 66 can be positioned on a top of the body 61 adjacent the contact surface 67, and groove 65 can be positioned on a bottom of the body 61 opposite the groove 66. The grooves 65 and 66 can be positioned to meet an apex of the internal cage gaskets 340 (refer to FIG. 12 and FIG. 34). The grooves 65 and 66 can prevent the pluggable heatsink 60 from walking out of the cage 352.

Referring to FIG. 31, the body 61 can include one or more channels extending therethrough. The one or more channels can include fins 73 that contact the cooling air for discharging heat from the pluggable heatsink 60 to the cooling air. The fins 73 and the one or more channels can be sized to meet both thermal requirements and to act like waveguides in the one or more channels to attenuate electro-magnetic noise as it enters or leaves the port/cage 352. The one or more channels can also be sized to meet thermal requirements and EMI requirements. The body can further include a horizontal bar 72 to make the max distance of the channels smaller.

The handle 63 can be formed integrally to the body 61 or can be a separate component attached to the body 61. The handle 63 can extend from the intake end 70 so as to protrude outward from the faceplate 310 when inserted into the module 300. The handle 63 can include a hole 64 or other similar features that can assist in gripping the handle for insertion and removal of the pluggable heatsink 60 into and out of the module 300.

The pluggable heatsink 60 can include one or more brackets 69 further connecting the handle 63 to the body 61 to strengthen the handle 63.

Referring to FIG. 34, when inserted into the module 300, the contact surface 67 mates with the mating surface 354 of the heat exchanger 350. Similar to the pluggable optical module 50, the one or more springs 380 of the cage assembly press the pluggable heatsink 60 upwards to ensure contact between the contact surface 67 and the mating surface 354 is maximized, thus, minimizing thermal resistance allowing the pluggable heatsink 60 to remove heat from the heat exchanger 350 via conduction and assist in cooling the pluggable optical modules 50.

The first wall 314 can have one or more cooling holes 359 that is positioned downstream of the exhaust end of the pluggable heatsink, and which can be positioned in the heat exchanger 350. The cutouts 336 of cages 332 can be sized to be open to the one or more cooling holes 359. Cooling air exiting the one or more openings 78 of angled surface 77 can be directed towards the one or more cooling holes 359.

The cage PCB 365 can also have one or more cooling holes 369 that is positioned downstream of the exhaust end 75 of the pluggable heatsink 60. Cooling air exiting the one or more openings 78 of angled surface 76 can be directed towards the one or more cooling holes 369.

While angled surfaces 76 and 77 are described herein, other surface configurations are also contemplated, such as a rounded surface with cooling holes, and the like.

A length of the pluggable heatsink 60 can be configured such that there is a gap between the exhaust end 75 and the an optical plug connector of the cage 352 to ensure that the cooling air can exit the exhaust end 75 and flow out of the cooling holes 359 and 369.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A module for use in a network element, the module comprising:
    a Printed Circuit Board (PCB);
    a faceplate connected to the PCB;
    a plurality of cage assemblies connected to the PCB, each cage assembly is configured to receive a pluggable optical module via a corresponding opening in the faceplate; and
    a shared heat exchanger that is integrally formed and substantially covers the plurality of cage assemblies, wherein the shared heat exchanger is configured to cool multiple pluggable optics in the plurality of cage assemblies;
    wherein the shared heat exchanger is a cold plate including a single cooling line that provides liquid cooling to the multiple pluggable optics.

2. The module of claim 1, wherein the single cooling line runs across the shared heat exchanger multiple times.

3. The module of claim 1, wherein the shared heat exchanger is also a finned heat exchanger.

4. The module of claim 1, wherein the shared heat exchanger is also a heat sink.

5. The module of claim 1, wherein each of the plurality of cage assemblies include a cutout configured to allow for a portion of the shared heat exchanger to sit therein and have continuous contact with a corresponding pluggable optical module received therein.

6. The module of claim 1, further comprising a biasing mechanism to bias each of the plurality of cage assemblies towards the shared heat exchanger.

7. The module of claim 1, further comprising a gasket on each of the plurality of cage assemblies.

8. The module of claim 1, wherein the plurality of cage assemblies are a first plurality of cage assemblies in a horizontal row and the shared heat exchanger is a first shared heat exchanger, and further comprising
    a second plurality of cage assemblies located under the first plurality of cage assemblies in a second horizontal row; and
    a second shared heat exchanger that substantially covers the second plurality of cage assemblies.

9. A network element comprising:
a plurality of modules interconnected to one another, at least one module includes
a Printed Circuit Board (PCB),
a faceplate connected to the PCB,
a plurality of cage assemblies connected to the PCB, each cage assembly is configured to receive a pluggable optical module via a corresponding opening in the faceplate, and
a shared heat exchanger that is integrally formed and substantially covers the plurality of cage assemblies, wherein the shared heat exchanger is configured to cool multiple pluggable optics in the plurality of cage assemblies,
wherein the shared heat exchanger is a cold plate including a single cooling line that provides liquid cooling to the multiple pluggable optics.

10. The network element of claim 9, wherein the single cooling line runs across the shared heat exchanger multiple times.

11. The network element of claim 9, wherein the shared heat exchanger is also a finned heat exchanger.

12. The network element of claim 9, wherein the shared heat exchanger is also a heat sink.

13. The network element of claim 9, wherein each of the plurality of cage assemblies include a cutout configured to allow for a portion of the shared heat exchanger to sit therein and have continuous contact with a corresponding pluggable optical module received therein.

14. The network element of claim 9, wherein the at least one module includes a biasing mechanism to bias each of the plurality of cage assemblies towards the shared heat exchanger.

15. The network element of claim 9, wherein the at least one module includes a gasket on each of the plurality of cage assemblies.

16. The network element of claim 9, wherein the plurality of cage assemblies are a first plurality of cage assemblies in a horizontal row and the shared heat exchanger is a first shared heat exchanger, and wherein the at least one module includes
a second plurality of cage assemblies located under the first plurality of cage assemblies in a second horizontal row; and
a second shared heat exchanger that substantially covers the second plurality of cage assemblies.

17. A network element comprising:
a plurality of modules interconnected to one another, at least one module includes
a Printed Circuit Board (PCB),
a faceplate connected to the PCB,
a first plurality of cage assemblies connected to the PCB in a first horizontal row, each cage assembly is configured to receive a pluggable optical module via a corresponding opening in the faceplate,
a first shared heat exchanger that is integrally formed and substantially covers the plurality of cage assemblies, wherein the shared heat exchanger is configured to cool multiple pluggable optics in the plurality of cage assemblies,
a second plurality of cage assemblies located under the first plurality of cage assemblies in a second horizontal row, and
a second shared heat exchanger that substantially covers the second plurality of cage assemblies.

18. The network element of claim 17, wherein at least one of the first shared heat exchanger and the second shared heat exchanger is a cold plate including a single cooling line that provides liquid cooling to the multiple pluggable optics.

19. The network element of claim 17, wherein at least one of the first shared heat exchanger and the second shared heat exchanger is a finned heat exchanger.

20. The network element of claim 17, wherein at least one of the first shared heat exchanger and the second shared heat exchanger is a heat sink.

* * * * *